(12) United States Patent
Gringeri et al.

(10) Patent No.: US 6,233,226 B1
(45) Date of Patent: May 15, 2001

(54) SYSTEM AND METHOD FOR ANALYZING AND TRANSMITTING VIDEO OVER A SWITCHED NETWORK

(75) Inventors: Steven Gringeri, Foxboro; Khaled Ali Shuaib, Winchester; Evert Basch, Stow, all of MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/240,484

(22) Filed: Jan. 29, 1999

Related U.S. Application Data
(60) Provisional application No. 60/112,140, filed on Dec. 14, 1998.

(51) Int. Cl.[7] .................................................. H04N 7/10
(52) U.S. Cl. ........................................... 370/252; 348/700
(58) Field of Search ............................. 348/700; 370/230, 370/235, 252, 253; 709/217–219

(56) References Cited

U.S. PATENT DOCUMENTS 5,990,945 * 11/1999 Sinha et al. ......................... 348/700

OTHER PUBLICATIONS

J.M. Pitts and J.A. Schormans, "Introduction to ATM: Design and Performance," John Wiley and Sons Ltd., England, 1996 pp. 93–132.

R. Guerin, H. Ahmadi, and M. Naghsgineh, "Equivalent Capacity and its Applications to Bandwidth Allocation in High–Speed Networks," IEEE J–SAC, vol. 9, No. 7, 99 968–998, Sep. 1991.

B.L. Mark and G. Ramamurthy, "Real–time Estimation of UPC Parameters for Arbitrary Traffic Sources in ATM Networks," IEEE Infocom 96 Proceedings, vol.1 pp. 384–392, 1996.

J. Lubin, "Sarnoff JND Vision Model," contribution to G–2.1.6 Compression and Processing Subcommittee, Aug. 1997, "Vision Model–Based Assessment of Distortion Magnitudes in Digital Video".

O. Rose, "Statistical properties of MPEG video traffic and their impact on traffic modeling in ATM systems," University of Wurzburg, Institute of Computer Science Research Report Series, Report #101, Feb. 1995.

A. Elwalid, D. Mitra, and R. Wentworth, "A New Approach for Allocating Buffers and Bandwidth to Heterogeneous, Regulated Traffic in an ATM Node," IEEE J–SAC, vol. 13, No. 6, pp. 1115–1127, Aug. 1995.

(List continued on next page.)

Primary Examiner—Melvin Marcelo
(74) Attorney, Agent, or Firm—Leonard Charles Suchyta

(57) ABSTRACT

A system and method are provided for analyzing and transmitting video over a switched network. According to an aspect of the invention, two phases are generally provided: an analysis phase performed before transmission of the video; and a transmission phase performed after analyzing the video stream. During the pre-transmission video analysis phase, the video stream is analyzed in order to determine the needed traffic control parameters, such as the peak cell rate, the sustained cell rate, and the maximum burst size. The goal of the analysis phase is to select a transmission traffic contract for the encoded video stream that will minimize the utilization of network resources and permit the quality of the video to be maintained. After the analysis phase, the transmission phase is performed to transmit the video over the network in accordance with the selected traffic control parameters. During the transmission phase, a model of the decoder buffer is kept at the source and is first pre-filled by transmitting data at the sustained cell rate. Thereafter, the video stream data is transmitted at the peak cell rate or the sustained cell rate depending on the availability of tokens.

42 Claims, 11 Drawing Sheets

OTHER PUBLICATIONS

H. Kobayashi and Q. Ren, "A diffusion approximation analysis of an ATM statistical multiplexer with multiple types of traffic, Part I: Equilibrium state solution," Proc. 1993 IEEE International Conference on Communications, vol. 2. (Geneva, Switzerland), pp. 1047–1053, May 1993.

T. V. Lakshman, P. Mishra, and K. K. Ramarkishnan, "Transporting compressed video over ATM networks with explicit rate feedback control," Proc. of IEEE INFOCOM 1997, Kobe, Japan, Apr. 1997.

H. Kanakia, P.P. Mishra, and A. R. Reibman, "An adaptive congestion control scheme for real time packet video transport," IEEE/ACM Transaction on Networking, vol. 3., pp. 671–682, Dec. 1995.

W. Feng, "Rate–constrained bandwidth smoothing for the delivery of stored video" Proc. of SPIE multimedia computing and networking, San Jose, CA, USA, vol. 3020, pp. 316–327, Feb. 1997.

E.W. Knightly, "Enforceable Quality of Service Guarantees for Bursty Traffic Streams," Proc. of IEEE.INFOCOM 1998, San Francisco, CA, USA, pp. 635–642, Mar. 1998.

E.W. Knightly and H. Zhang, "D–BIND: An Accurate Traffic Model for Providing QoS Guarantees to VBR Traffic," IEEE/ACM Transaction on Networking, vol. 5, No. 2, Apr. 1997.

W. Feng and J. Rexford, "A Comparison of Bandwidth Smoothing Techniques for the Transmission of Prerecorded Compressed Video," Proc. of IEEE INFOCOM 1997, Kobe, Japan, pp. 58–66, Apr. 1997.

J. Rexford, S. Sen, J. Dey, W. Feng, J. Kurose, J. Stankovic, and D. Towsley, "Online Smoothing of Live, Variable Bit Rate Video," Proc. of IEEE INFOCOM 1997, Kobe, Japan, pp. 235–243, Apr., 1997.

Z. Zhang, J. Kurose, J. Salehi, and D. Towsley, "Smoothing Statistical Multiplexing, and Call Admission control for Stored Video," IEEE Journal on Selected Areas of Communications, vol. 15, No. 6, Aug. 1997.

J. Salehi, Z. Zhang, J. Kurose, and D. Towsley, "Supporting Stored Video: Reducing Rate Variability and End to End Resource Requirements Through Optimal Smoothing," IEEE/ACM Transaction on Networking, vol 6, No. 4, Aug. 1998.

* cited by examiner

SYSTEM AND METHOD FOR ANALYZING AND TRANSMITTING VIDEO OVER A SWITCHED NETWORK

This application claims the benefit of U.S. Provisional Application No. 60/112,140, filed Dec. 14, 1998.

GOVERNMENT LICENSE RIGHTS

This invention was made with Government support under Cooperative Agreement No. DAAL01-96-2-0002, awarded by the U.S. Army Research Laboratory. The Government has certain rights in the invention, including a paid-up license in the invention and the right in limited circumstances to require the patent owner to license others on reasonable terms as provided for by the terms of the Cooperative Agreement.

BACKGROUND OF THE INVENTION

I. Field of the Invention

The present invention relates to the delivery of video streams over a switched network. More particularly, the invention relates to a system and method for facilitating the scheduling and transmission of video streams over a switched network, such as an Asynchronous Transfer Mode (ATM) network.

II. List of Acronyms

The written description provided herein contains acronyms which refer to various techniques, services, groups, modes and standards. Although known, use of several of these acronyms is not strictly standardized in the art. For purposes of the written description provided herein, these acronyms are defined as follows:

ABR—Available Bit Rate
ATM—Asynchronous Transfer Mode
B-Picture—Bidirectionally-Coded Picture
CBR—Constant Bit Rate
CDV—Cell Delay Variation
CDVT—Cell Delay Variation Tolerance
CLR—Cell Loss Ratio
CTD—Cell Transfer Delay
DCT—Discrete Cosine Transform
EBW—Effective Bandwidth
GCRA—Generic Cell Rate Algorithm
GoP—Group of Pictures
I-Picture—Intra-Coded Picture
ISDN—Integrated Services Digital Network
JPEG—Joint Photographic Experts Group
LAN—Local Area Network
MBS—Maximum Burst Size
$MBS_s$—Sustainable Burst Size
MCR—Minimum Cell Rate
MPEG—Moving Picture Experts Group
P-Picture—Predictively-Coded Picture
PCR—Peak Cell Rate
QoS—Quality of Service
SCR—Sustained Cell Rate
TCP\IP—Transmission Control Protocol\Internet Protocol
UPC—Usage Parameter Control
VBV—Video Buffer Verifier
WAN—Wide Area Network

III. Background and Material Information

Switched networks are used for transporting various types of data, including audio and video data. The transmission of video data is much more network intensive than the transmission of audio data. However, video quality over a switched network can be maintained when sufficient bandwidth capacity and other network resources are provided. As a result, video retrieval, video-on-demand and other video or multimedia services are often implemented through switched-based networks to provide the transfer of video from a source to one or more destinations.

Switched networks transport data through the use of connections or routes that are established by switch elements in the network. These routes may be fixed or temporal with respect to the data that is transferred. An example of a switched-based network that creates fixed connections or routes between two points is an ATM network. ATM is a core technology for B-ISDN networks, and is commercially deployed in local area networks (LANs) and wide area networks (WANs). In an ATM network, data is transferred in cells or packets over a connection that is created and fixed when the data transfer begins. This differs from other network technologies, such as Transmission Control Protocol/Internet Protocol (TCP/IP), in which messages are divided into packets that can take different routes from source to destination.

Current implementations of ATM support data transfer rates of rates up to 2.4 Gbps (gigabits per second). This compares to a maximum of 1 Gbps for Ethernet, a technology that is used for most LANs. In addition, small-fixed size cells (53 bytes) are utilized in ATM to allow multiplexing of various data types with guaranteed cell rate, cell loss and cell delay variation parameters. These capabilities make ATM well suited for real-time applications such as video or multimedia applications.

When provisioning ATM services, a user has a choice of several different types of service rates. The available service categories are defined in the Traffic Management 4.0 specification issued by the ATM Forum Traffic Management Group. (ATM Forum, "ATM Traffic Management Specifications 4.0," 1996). One type of service is Constant Bit Rate (CBR) service. With CBR service, a fixed bit rate is specified so that data is sent in a steady stream similar to the service provided by a leased line. CBR traffic is given the highest priority in the network and, therefore, provides bounded cell relay, cell delay variation, and cell loss characteristics. Another ATM service is Variable Bit Rate (VBR) service, which is frequently used for transporting audio and video data. With VBR service, a specified throughput capacity is guaranteed, but data is not sent evenly at a fixed rate. The VBR service category is divided into two subclasses, one for real-time and the other for non-real-time services. The real-time VBR service category is used for services that have variable bit rates combined with stringent real-time requirements. Real-time VBR traffic provides strict bounds on cell delay, cell delay variation, and cell loss. The non-real-time VBR service category is used when timely delivery of information is important, but some amount of jitter can be tolerated. Non-real-time VBR does not strictly bound cell delay and cell delay variation like real-time VBR does.

A third type of ATM service is Unspecified Bit Rate (UBR) service. UBR service does not guarantee any throughput levels and is the lowest priority traffic class. UBR service is used for applications in which the transfer rate is not critical, such as file transfers and other applications in which delays can be tolerated. A fourth type of ATM service is Available Bit Rate (ABR) service. ABR service provides a guaranteed minimum capacity but also allows data to be bursted at higher capacities when the network is free. ABR is the only service category in which the network provides feedback to the sender or source about transmission rates. If the network becomes congested, resource management cells are sent to the user asking that the transmission rate be reduced. ABR service is designed to provide a low cell loss rate, but bounds for the maximum delay and delay variation are not provided.

A unique feature of ATM is the ability to provide guaranteed throughput levels. The ATM Forum has defined Quality of Service (QoS) parameters which quantify end-to-end network performance at the ATM layer. (ATM Forum, "ATM Traffic Management Specifications 4.0," 1996). The QoS parameters include a traffic descriptor which specifies the rate and characteristics of users traffic, negotiable network performance parameters, and fixed non-negotiable characteristics of the network. A traffic contract may contain two or more of the following parameters: Peak Cell Rate (PCR), Sustained Cell Rate (SCR), Minimum Cell Rate (MCR), Cell Delay Variation Tolerance (CDVT), and Maximum Burst Size (MBS).

The traffic descriptor or contract describes the rate Roth peak and average), the burstiness, and jitter tolerance for a connection. The PCR defines the maximum instantaneous rate at which a user can send data, while the SCR is the long term average rate over an interval. For CBR services over an ATM network, the peak and sustained cell rates will be the same while for other service classes the sustained rate will be lower than the peak rate. In addition to having different peak and average rates, VBR services define an MBS which specifies the maximum number of back-to-back cells that will be generated at the peak rate. The cell delay variation tolerance is the maximum jitter allowed in user data before it enters the network. The minimum cell rate is a minimum bandwidth guaranteed by the network. For ABR service the actual rate will be between the minimum rate and the peak rate depending on how congested the network is. Three QoS parameters have been identified which may be negotiated between the end user and the network when a connection is established: the Cell Transfer Delay (CTD), the Cell Delay Variation (CDV), and the Cell Loss Ratio (CLR). The CTD is the average transmission time for a cell, while the CDV is the maximum variation from the average transmission time allowed. The CLR is the fraction of the transmitted cells that are not delivered to their destination.

In order to reduce resource requirements for storing and transmitting video steams, compression techniques such as Moving Picture Experts Group (MPEG) and motion-Joint Photographic Experts Group (motion-JPEG) are utilized. MPEG achieves high compression rates by storing only the changes from one frame to another, instead of each entire frame. The video information is then encoded using a technique called Discrete Cosine Transform (DCT). There are two major MPEG standards: MPEG-1 (see, International Standard ISO/IEC 11172-2) and MPEG-2 (see, International Standard ISO/IEC 13818, 1996). The JPEG standard is a lossy compression technique for color images that can reduce file sizes to about 5% of their normal size. The motion-JPEG standard extends the JPEG standard by supporting video images, whereby each frame in the video is stored with the JPEG format.

Through a combination of spatial and temporal compression techniques, MPEG video can be compressed up to approximately 30:1 while preserving image quality. The spatial compression techniques are the same as those used by JPEG and include DCT, quantization and entropy coding. The temporal compression techniques used rely on block-based motion compensation to reduce the temporal redundancy. In MPEG, three main picture types are defined, including Intra-Coded Picture (I-Picture), Predictively-Coded Picture (P-Picture) and Bidirectionally-Coded Picture (B-Picture). I-Pictures are self-contained and are coded without reference to other pictures. They are used as reference frames during the encoding of other picture types and are coded with only moderate compression. P-Pictures are coded more efficiently using motion-compensated prediction from a past intra or predictive picture. B-Pictures provide the highest degree of compression and require both past and future reference pictures for motion compensation. Several frames may be grouped together in a pattern to form what is referred to as a Group of Pictures (GoP).

The MPEG standards do not prescribe the encoding process. Instead, the standards specify the data input format (i.e., the syntax) for the decoder, as well as detailed specifications for interpreting this data (i.e., the decoding semantics). An encoder must follow a set of steps known as the encoding process to compress video data. This process is not standardized and may vary from application to application, depending on the particular application's requirements and complexity limitations. This allows the encoding process to be optimized for an application's bandwidth and quality requirements. Commercially available encoders support a wide range of transmission and storage applications, using both CBR and VBR encoding.

The MPEG standards have been widely adopted for providing digital video services. Digital video, however, is bursty in nature. The burstiness of digital video depends on the frequency of changes in the background and the movement of objects in the foreground. Without rate control, the output bit stream of a video encoder will be of variable bit rate since it depends on the complexity of the scene, the degree of motion, and the frequency of scene changes. With variable rate MPEG encoding, this implies that different program materials will require different traffic contracts based on the complexity of the scene, the degree of motion and the frequency of change of the video being transmitted over the network.

As digital video systems are deployed, efficient utilization of storage and network resources will be needed to reduce costs and increase revenues. Any solution for providing storage and bandwidth savings must also maintain video quality. Compression techniques such as variable bit rate MPEG permit high compression rates while preserving image quality. However, uncontrolled burstiness will lead to inefficient use of network resources by occasionally requiring excessively high processing, storage (buffering) and transmission capacity from the network. Past attempts have focused on constant bit rate solutions for delivering real-time video to customers or clients. For example, digital video encoders have been implemented with additional rate-control and buffering in the encoder to generate a constant bit rate stream for transmission and distribution applications. In such systems, the fullness of the rate-control buffer dynamically controls the quantization resolution so that the number of bits generated per picture satisfies the bit rate constraints of the video stream. These rate adaption methods not only lead to variable video quality, but also they result in poor utilization of bandwidth since the rate must be selected to accommodate the most complex scenes, and the encoder may need to use stuffing bits to maintain the constant bit rate.

As a result, there is presently a need for a technique and/or arrangement that permits the transmission and distribution of digital video streams over a switched network, while minimizing the usage of network and storage resources. There is also a need for a system and method that controls the burstiness and bit rate variability of a video stream, so that the stream adheres to a traffic contract while maintaining a desired level of video quality. Such features would enable providers to transmit and distribute video streams to clients in a cost effective manner and with guaranteed levels of video quality and service.

SUMMARY OF THE INVENTION

In accordance with the principles of the present invention, as embodied and broadly described herein, a system and method are provided for analyzing and transmitting video over a switched network. According to one aspect of the invention, the system and method are adapted for transmitting video streams over an ATM network, wherein the video stream is encoded in accordance with a compression standard, such as the MPEG standards. The encoded video stream is preferably shaped before entering the network in order to reduce the burstiness of the video stream and minimize utilization of network resources. In accordance with an embodiment of the invention, two phases are generally provided: an analysis phase performed before transmission; and a transmission phase performed after analyzing the video stream.

During the pre-transmission video analysis phase, the video stream is analyzed in order to determine the needed traffic control parameters, such as the peak cell rate, the sustained cell rate, and the maximum burst size. The goal of the analysis phase is to select a transmission traffic contract for the encoded video stream with the criteria of minimizing network resources (including the required bandwidth) and maintaining video quality. According to an aspect of the invention, the analysis phase is performed at the source or location of the server and a model of the decoder buffer is provided at the source in order to perform the analysis of the video stream. A just-in-time scheduling analysis is utilized to analyze the video based on a selected sustained cell rate. According to this process, the system operates at the selected sustained rate unless underflow or overflow of the model decoder buffer occurs. For underflows, the just-in-time scheduling determines the rate that is required to guarantee arrival of the data just-in-time for processing. In the case of an overflow, the rate is reduced so that the buffer does attempt to fill up beyond capacity. With this process, the peak cell rate and sustainable burst size is determined for the given sustained cell rate in order to provide traffic control parameters which guarantee that the decoder buffer will not underflow or overflow when the video stream is transmitted.

The just-in-time scheduling process of the invention may be modified with a look-ahead process to determine when high cell rates will be required so that data can be sent early to reduce the overall rate without overflowing the decoder buffer. The look-ahead process is most effective when used with video sequences that are bursty in nature or have a lot of variability in rate. In order to determine the optimal potential traffic contract, the just-in-time scheduling method selects the number of frame periods to look-ahead (k) and averages these rates to obtain a rate that will minimize the peak cell rate for the stream. As a result, the peak cell rate of a specific video stream is reduced for larger look ahead periods and less network resources are required without reducing the sustainable burst size.

During the transmission phase the encoded video stream is transported in accordance with the optimal traffic contract determined during the analysis phase. During the transmission phase, a model of the decoder buffer is kept at the source or location of the server. The decoder buffer is first prefilled by transmitting data at the sustained cell rate. Thereafter, the video stream data is transmitted at the peak cell rate or the sustained cell rate depending on the availability of tokens. If the decoder buffer becomes full, then transmission of the video stream is stopped until a frame is removed from the decoder buffer. Thereafter, transmission is resumed at the peak cell rate or the sustained cell rate.

According to an embodiment of the invention, a system is provided for analyzing and transmitting an encoded video sequence over a switched network. In this system, the video sequence is transmitted in transmission cells over the network from a source location to a destination location. The disclosed system includes an analysis module that analyzes the video sequence to determine a set of traffic control parameters for transmitting the video sequence over the switched network with minimum use of network resources. The system also includes a transmission module that receives the set of traffic control parameters from the analysis module and transmits the video sequence over the network in accordance with the traffic control parameters determined by the analysis module.

The analysis module preferably includes a model of a decoder buffer and determines the set of traffic control parameters by calculating a transmission rate for each video frame of the video sequence based on a just-in-time scheduling analysis. According to an aspect of the invention, the analysis module sets the transmission rate for each video frame to a predetermined sustained cell rate unless underflow or overflow of the decoder buffer model will occur. The just-in-time scheduling analysis performed by the analysis module can include a look ahead process such that the analysis module will calculate a transmission rate for a video frame by looking ahead a predetermined number of video frames and determining a maximum average transmission rate over the predetermined number of video frames.

The disclosed transmission module also includes a model of a decoder buffer and preferably transmits the video sequence over the network at the sustained cell rate or the peak cell rate depending on the fullness of the decoder buffer model. According to an aspect of the invention, the analysis module and the transmission module are provided at the source of the transmission, and the encoded video sequence is a variable bit rate encoded video sequence. The switch network may comprise an Asynchronous Transfer Mode (ATM) network. A traffic contract analyzer may also be provided to determine an optimum traffic contract from a plurality of traffic contracts provided as output to the traffic contract analyzer from the analysis module. The traffic contract analyzer preferably includes an effective bandwidth metric for determining the optimum traffic contract that will require minimum use of network resources.

According to another embodiment of the invention, a method is provided for transporting a variable bit rate encoded video sequence over a switched network. The disclosed method includes: analyzing the video sequence, prior to transmission over the network, to determine a set of traffic control parameters that will minimize the use of network resources that are required for transmitting the video sequence; and transmitting the video sequence in cells over the network based on the determined set of traffic control parameters. In order to transmit the video sequence, the method also preferably includes establishing a connection over the network in accordance with the determined set of traffic control parameters.

Consistent with the principles of the invention, the disclosed method also comprises providing a model of a decoder buffer and determining the set of traffic control parameters by calculating a transmission rate for each video frame of the video sequence based on a just-in-time scheduling analysis. Further, the method preferably includes: calculating, in the case of an underflow condition of the model decoder buffer, a transmission rate for a video frame that will guarantee arrival of the video frame just-in-time for processing; and calculating, in the case of an overflow condition of the model decoder buffer, an adjusted transmission rate to prevent an overflow of the model decoder buffer.

In accordance with another embodiment of the invention, a video distribution system is disclosed for distributing an encoded video sequence over a switched network. The system comprises: means for analyzing the video sequence to determine a set of traffic control parameters based on a predetermined sustained cell rate and a just-in-time scheduling analysis of a transmission rate of each frame of the video sequence; and means for transmitting the video sequence over the network in accordance with the traffic control parameters determined by the analyzing means.

It is to be understood that both the foregoing general description and the following detailed description are exemplary and explanatory only and are not restrictive of the invention, as claimed. Further features and/or variations may be provided in addition to those set forth herein. For example, the invention may be directed to various combinations and subcombinations of the disclosed features and/or combinations and subcombinations of several further features discussed below in the detailed description.

BRIEF DESCRIPTION OF THE DRAWINGS

The accompanying drawings, which are incorporated in and constitute a part of this specification, illustrate various embodiments and/or features of the invention and together with the description, serve to explain the principles of the invention. In the drawings.

DETAILED DESCRIPTION

Figure 1:
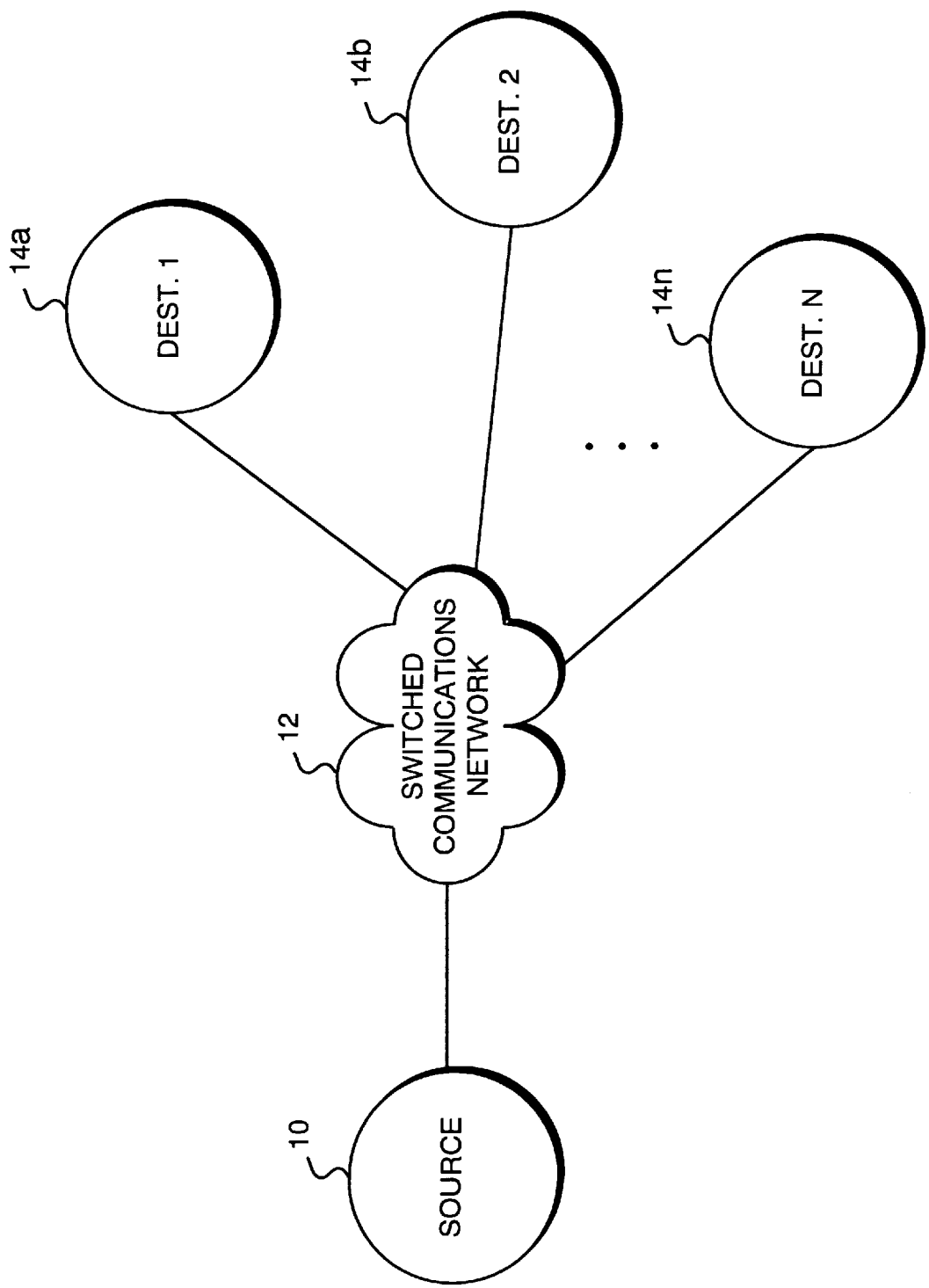
FIG. 1 illustrates, in general block diagram form, a switched communications network environment in which the features of the present invention may be implemented.

Systems and methods consistent with the principles of the invention overcome the shortcomings of existing systems by providing techniques for analyzing and transmitting encoded video over a switched network. As further discussed below, such systems and methods are well-suited for MPEG video streams (such as MPEG-1, MPEG-2 or MPEG-4 video streams) that are encoded prior to transmission. They may be applied in various applications for transporting video from a server or source to one or more dispersed clients or destinations.

Consistent with the principles of the invention a system and method are provided for analyzing and transmitting video over a switched network. According to one aspect of the invention, the system and method are adapted for transmitting video streams over an ATM network, wherein the video stream is encoded in accordance with a compression standard, such as the MPEG standards. The encoded video stream is preferably shaped before entering the network in order to reduce the burstiness of the video stream and minimize utilization of network resources. In accordance with an embodiment of the invention, two phases are generally provided: an analysis phase performed before transmission; and a transmission phase performed after analyzing the video stream.

During the pre-transmission video analysis phase, the video stream is analyzed in order to determine the needed traffic control parameters, such as the peak cell rate, the sustained cell rate, and the maximum burst size. The goal of the analysis phase is to select a transmission traffic contract for the encoded video stream with the criteria of minimizing network resources (including the required bandwidth) and maintaining video quality. According to an aspect of the invention, the analysis phase is performed at the source or location of the server and a model of the decoder buffer is provided at the source in order to perform the analysis of the video stream. A just-in-time scheduling analysis is utilized to analyze the video based on a selected sustained cell rate. According to this process, the system operates at the selected sustained rate unless underflow or overflow of the model decoder buffer occurs. For underflows, the just-in-time scheduling determines the rate that is required to guarantee arrival of the data just-in-time for processing. In the case of an overflow, the rate is reduced so that the buffer does attempt to fill up beyond capacity. With this process, the peak cell rate and sustainable burst size is determined for the given sustained cell rate in order to provide traffic control parameters which guarantee that the decoder buffer will not underflow or overflow when the video stream is transmitted.

The just-in-time scheduling process of the invention may be modified with a look-ahead process to determine when high cell rates will be required so that data can be sent early to reduce the overall rate without overflowing the decoder buffer. The look-ahead process is most effective when used with video sequences that are bursty in nature or have a lot of variability in rate. In order to determine the optimal potential traffic contract, the just-in-time scheduling method selects the number of frame periods to look-ahead (k) and averages these rates to obtain a rate that will minimize the peak cell rate for the stream. As a result, the peak cell rate of a specific video stream is reduced for larger look ahead periods and less network resources are required without reducing the sustainable burst size.

During the transmission phase the encoded video stream is transported in accordance with the optimal traffic contract determined during the analysis phase. During the transmission phase, a model of the decoder buffer is kept at the source or location of the server. The decoder buffer is first prefilled by transmitting data at the sustained cell rate. Thereafter, the video stream data is transmitted at the peak cell rate or the sustained cell rate depending on the availability of tokens. If the decoder buffer becomes full, then transmission of the video stream is stopped until a frame is removed from the decoder buffer. Thereafter, transmission is resumed at the peak cell rate or the sustained cell rate.

FIG. 1 illustrates an exemplary switched-based network environment in which the invention may be implemented to facilitate the distribution of video. In FIG. 1, a switched communications network 12 is provided that transports data from a source 10 to one or more of a plurality of destinations 14A–14N. In the exemplary network environment of FIG. 1, switched network 12 transports the data through the use of a connection or route that is established by switch elements (not shown) in the network. In order to establish a connection between source 10 and one of the plurality of destinations 14A–14N, source 10 signals switched network 12 with the required traffic parameters and network 12 responds by establishing a connection or route between the two points that provides a communication path with the requested traffic parameters. The connection or route may be fixed or temporal with respect to the data that is transferred. If the required network resources are not available, switched network 12 may respond to source 10 with an indication that a connection can not be established with the requested traffic parameters.

The network environment of FIG. 1 may be utilized for different applications and services, including video retrieval, video-on-demand and other video applications and services. In such applications, source 10 may include a video server that stores video clips in one or more storage devices, such as tape, disc or mass storage devices. The video sequences or clips may comprise full-motion video or still frame images. Each of the destinations 14A–14N may be provided with a workstation or client device for decoding the transmitted video streams and performing further processing on the decoded video to facilitate the display and/or gathering of information relating to the video data.

Figure 2:
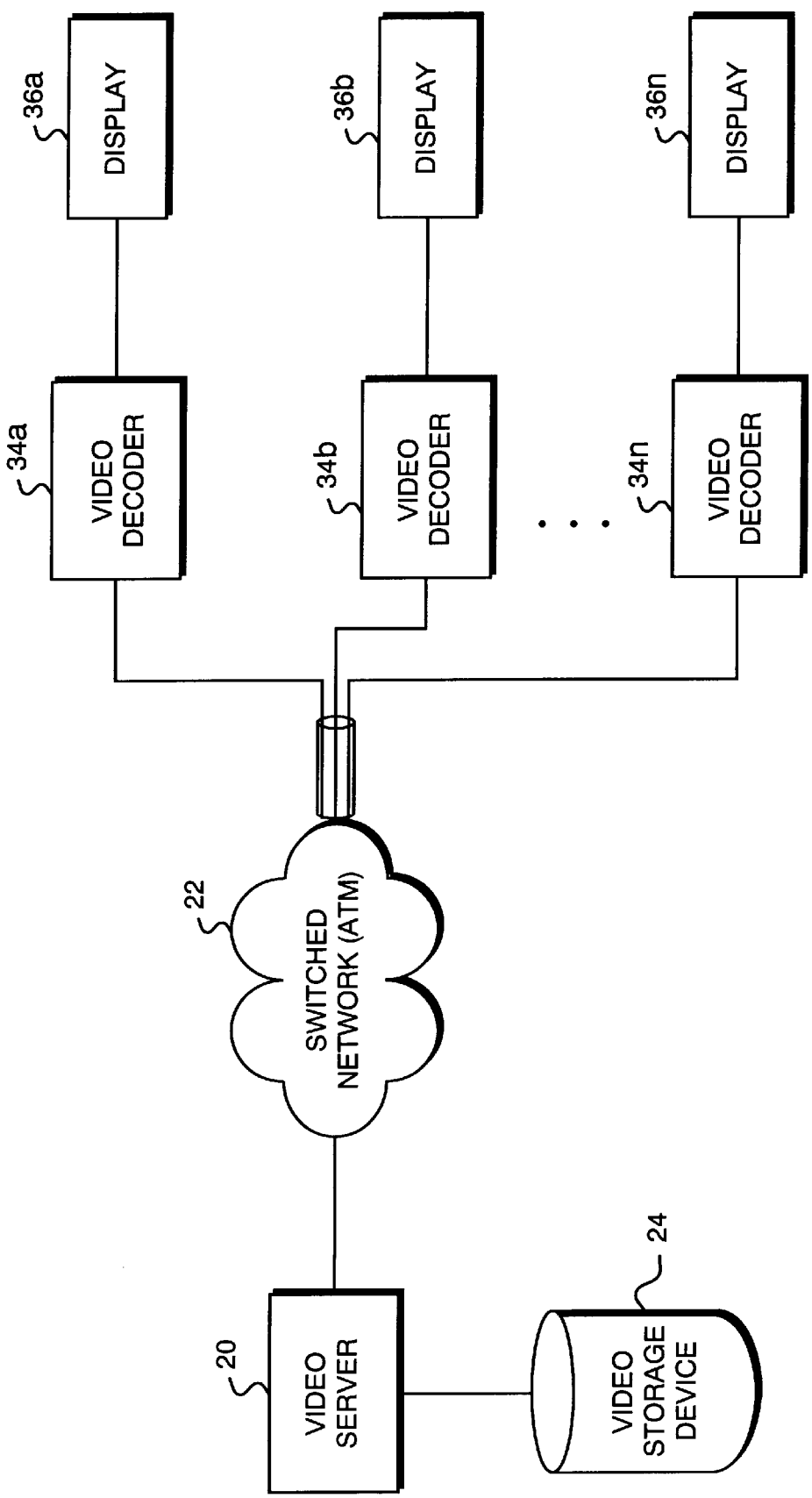
FIG. 2 illustrates an exemplary video distribution network environment in which the invention may be implemented for analyzing and transmitting video streams over an ATM network.

FIG. 2 illustrates an exemplary video distribution network environment in which the features of the invention can be implemented. In FIG. 2, a video distribution system is shown in which stored video streams are distributed from a source to one or more of a plurality of destinations over a switched network 22. Switched network 22 is preferably implemented in FIG. 2 as an ATM network such that data is transferred in cells or packets over a connection that is created and fixed when the data transfer begins. The source includes a video server 20 that is connected to at least one storage device 24 for storing various video clips or sequences. The video clips are encoded at the source prior to transmission in order to reduce the overall rate of the video. Compression techniques such as MPEG may be used for this purpose. To conserve storage space, the video data may be encoded and stored in a compressed format in the video storage device 24. Although FIG. 2 illustrates a single source in the system, more than one video source location may be provided. In addition, it is possible to provide multiple servers and encoders at a source location and/or provide a real-time video server at a source location.

Each of the destinations is equipped with a video decoder 34A–34N for decoding the video streams transmitted over the switched network 22. Each of the decoders 34A–34N is capable of decoding the transmitted video sequences based on the compression standard or protocol at the source. The video decoders 34A–34N can be implemented to handle a wide array of compression standards, including MPEG, JPEG and other compression standards. The resultant video stream decoded by the video decoders may be further processed and/or prepared for display on display devices 36A–36N provided at each destination or client location.

For each ATM connection over network 22, one or more ATM layer QoS objectives are negotiated between the network and the end system. The network agrees to meet or exceed the negotiated QoS, as long as the end system maintains the negotiated traffic contract. Since QoS commitments are probabilistic in nature and the actual QoS can vary over the duration of the connection, short-term performance observations can be worse or better than the agreed upon QoS commitment.

With an ATM network, Usage Parameter Control (UPC) is utilized to limit and police traffic at the ingress to the network so that quality of service can be maintained. Traffic is policed in an ATM network using the Generic Cell Rate Algorithm (GCRA). The GCRA as defined by the ATM Forum uses two leaky buckets to describe the stream's traffic characteristics (see, ATM Forum, "ATM Traffic Management Specifications 4.0," 1996). The first leaky bucket polices the streams peak rate, while the second leaky bucket polices the stream's average or sustained rate. Both CBR and VBR traffic is policed based on a peak cell rate and a cell delay variation tolerance, while VBR traffic is also policed for sustained rate and maximum burst size. The characteristics of variable rate traffic can be described using the parameters of the sustained rate leaky bucket. This leaky bucket is controlled using two parameters, the sustained rate and the burst tolerance period. The burst tolerance period can be expressed as the MBS if a particular PCR is specified.

For a given variable rate traffic source there are many potential conforming traffic contracts. If the SCR is fixed, there exists an infinite number of PCR/MBS pairs which can satisfy the traffic contract for a given stream. To determine the traffic contract for a particular stream, cell arrivals can be tested to determine if they are earlier or later than expected given a particular SCR. For each successive cell which arrives early, the burst tolerance period must be increased so that the stream will still conform to the traffic contract. Cells that arrive late will reduce the cumulative burst tolerance. If the maximum burst tolerance is found for a stream, this value can be used, as described above, to calculate the MBS.

Another measurable metric for a stream is the sustainable burst size ($MBS_S$). The $MBS_S$ represents the number of cells that must be buffered in the network if a stream's rate is shaped to the sustained cell rate. This metric is calculated by comparing the streams rate with the SCR to determine the maximum number of cells that must be buffered. When the rate is greater than the SCR, the number of cells that must be stored is determined. When the rate is less than the SCR, stored cells can be transmitted and the buffer fullness can be reduced. The $MBS_S$ will be the maximum cumulative buffering requirement for a stream. Since this metric does not depend on the PCR, its value should not change if the PCR is adjusted.

Figure 3A:
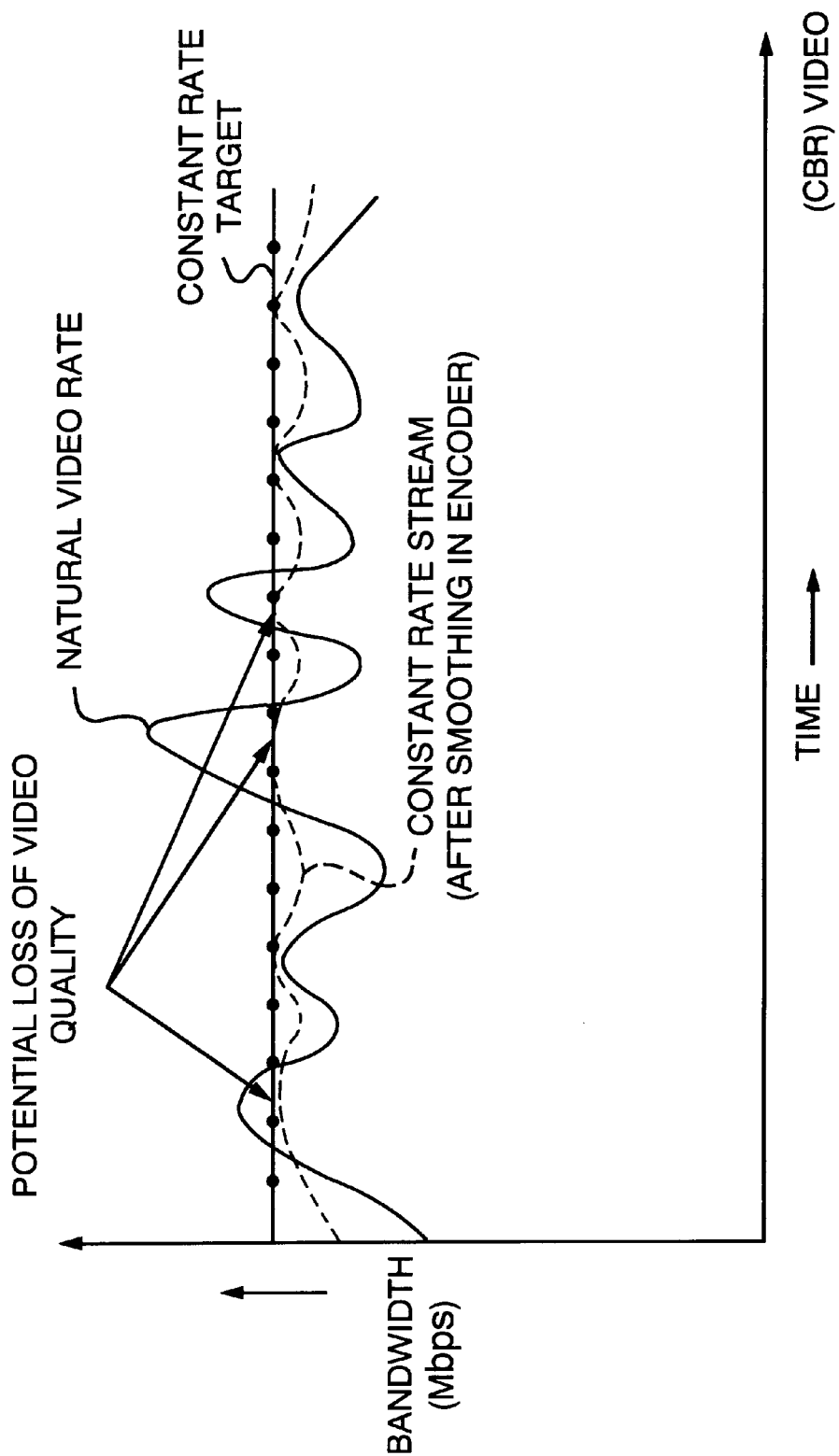
FIGS. 3A and 3B illustrate exemplary bandwidth requirements of a Constant Bit Rate (CBR) video and a Variable Bit Rate (VBR) video, respectively.
Figure 3B:
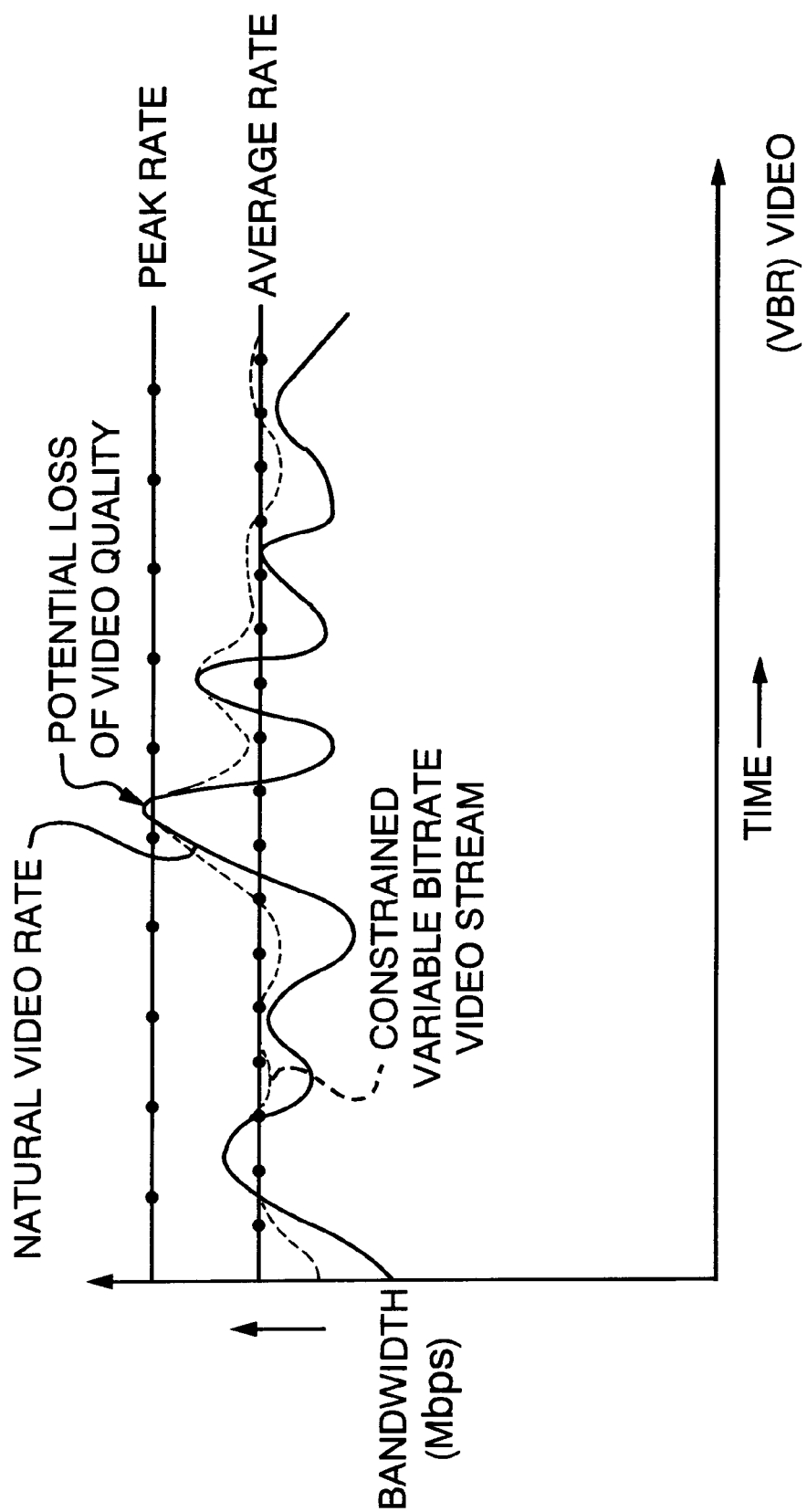

As indicated above, systems and methods consistent with the principles of the invention can provide a technique for analyzing and smoothing pre-encoded variable rate MPEG video streams so as to conform to an ATM traffic contract. The MPEG standards define a buffering and rate control strategy to smooth both constant and variable rate streams. FIGS. 3A and 3B are examples that illustrate how the bit rate can vary for CBR versus VBR encoding. The rates shown are not instantaneous frame rates but are averaged over approximately a GOP. In the examples of FIGS. 3A and 3B, the natural video rate is shown. The natural video rate represents the required rate to achieve a particular video quality.

For constant bit rate MPEG, smoothing and source rate control are used to produce a stream whose rate never exceeds a particular constant rate target. This means that in video segments when the natural rate substantially exceeds the constant rate target, there is a potential for loss in video quality. In the case of variable rate MPEG, the rate is constrained to a long-term average rate and a short-term peak rate instead of a single constant rate. This allows more variability of the video rate since even though the average rate must be maintained over the entire sequence, it is possible to code at rates up to the peak rate for difficult or complex scenes. In the VBR example of FIG. 3B, the natural video rate exceeds the peak rate less frequently than in the CBR example illustrated in FIG. 3A. As a result, with VBR encoding there are fewer scenes with potential loss in video quality. This added flexibility in selecting rates during difficult scenes allows improved video quality for the VBR case, although the average rate of the VBR stream will be less than the bit rate for the CBR stream. The inventors of the present invention have found that by analyzing and smoothing variable bit rate MPEG, it is possible to achieve substantial savings and networking resources while maintaining video quality, if the burstiness of the video can be controlled using some pre-specified constraints. In addition, it is possible to offer more constant video quality than can be provided using constant rate encoding. As further discussed below, the present invention achieves these goals by analyzing variable rate MPEG streams that are pre-encoded to generate an ATM traffic contract that uses minimal network resources and provides sufficient video quality during transmission.

In accordance with an aspect of the invention, two distinct phases are provided for analyzing and transmitting video: an analysis phase which is performed prior to transmission of the video; and, a transmission phase which is performed after the analysis of the entire video sequence. In each phase, a model of the decoder buffer is utilized and kept at the source. The goal of the pre-transmission video analysis phase is to determine the needed traffic control parameters (e.g., PCR, SCR and MBS) for the transmission of the stored video clip or sequence. The traffic contract is determined based on achieving the best utilization of bandwidth, while guaranteeing the desired QoS requirements for the application. The analysis phase is performed based on a shaping algorithm that minimizes network resources without overflowing or underflowing the decoder buffer. After determining the best traffic contract, the transmission phase is performed to transmit the video stream over the switched network. In the transmission phase, the selected traffic contract parameters and decoder buffer model are utilized to transmit the video sequence. During this phase, the video sequence is transmitted at the PCR or SCR depending on the state of the decoder buffer and/or the state of the sustained token bucket.

Figure 4:
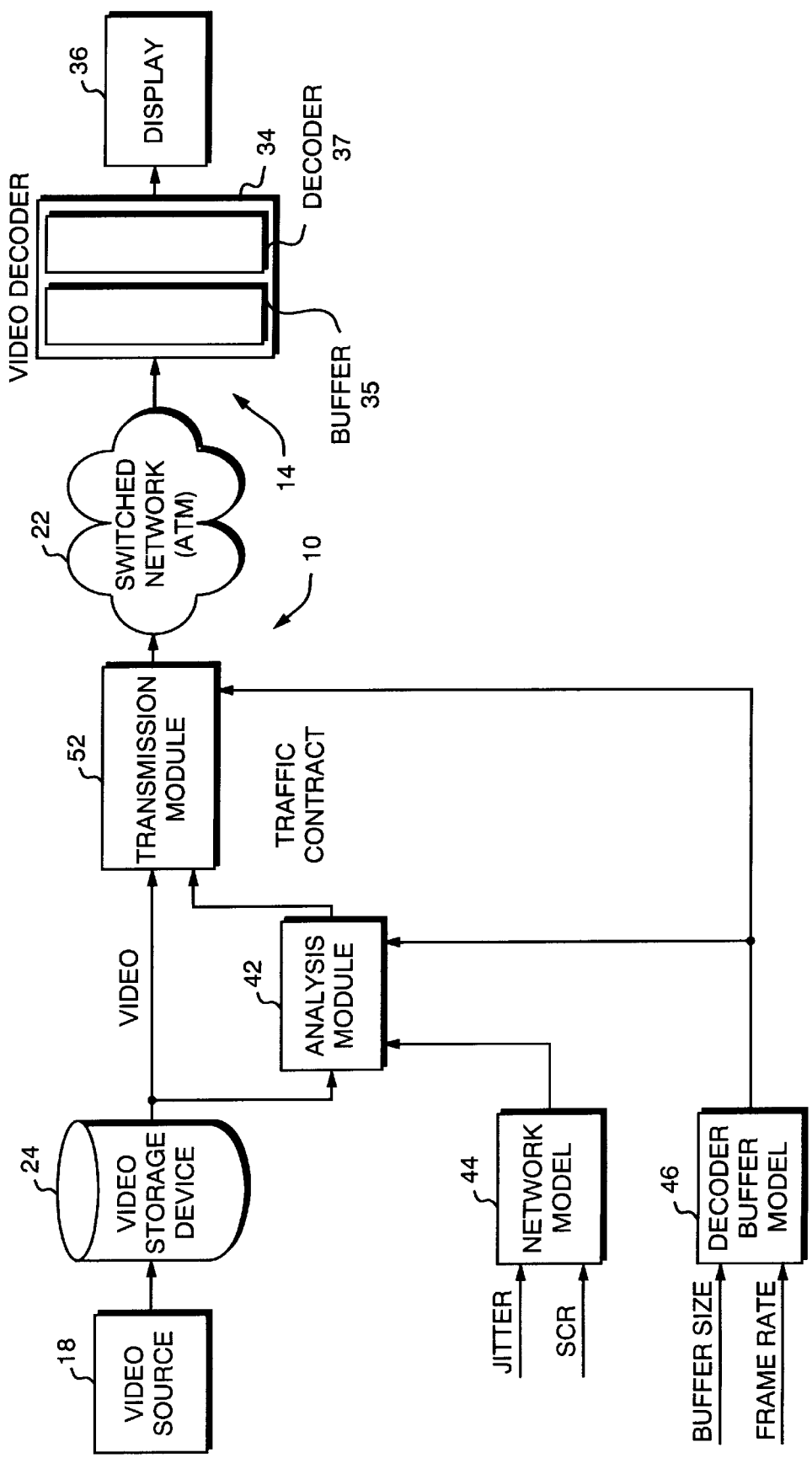
FIG. 4 illustrates a system for analyzing and transmitting video over a switched network, consistent with the principles of the invention.

FIG. 4 illustrates, in accordance with an embodiment of the invention, a system for analyzing and transmitting encoded video streams over a switched network. In the embodiment of FIG. 4, switched network 22 is implemented as an ATM network for facilitating the transport of video streams from a source 10 to a destination 14. Although only one destination location 14 is illustrated in FIG. 4, it is of course possible to provide a plurality of similarly equipped destination locations that are connected to switch network 22 and are capable of receiving video streams from source 10. The arrangement provided in FIG. 4 can be used in connection with various applications, including video-on-demand, video distribution and other video services and applications.

In FIG. 4, the video clips or sequences are stored in a video storage device 24. The video storage device 24 may include tape, disc or mass storage devices for storing one or more video sequences. The video sequences may be received from a video source 18 and stored in video storage device 24 in an encoded or compressed format. In accordance with a preferred embodiment of the invention, the variable bit rate video streams are encoded with an MPEG standard to conserve storage capacity and minimize network resources.

As shown in FIG. 4, a video sequence stored in video storage device 24 is provided as input to an analysis module 42 and a transmission module 52. These modules may be implemented through any suitable combination of hardware and software, and preferably reside at the source location 10. By way of a non-limiting example, analysis module 42 and transmission module 52 are implemented as software modules residing on a video server, computer platform, workstation or microprocessor-based hardware at source location 10. Analysis module 42 performs the various operations and processes associated with the analysis phase of the invention for determining an optimum traffic contract for transmitting the encoded video stream. Transmission module 52 performs all of the necessary operations and processes of the transmission phase of the invention for transmitting the video stream over switched network 22. In accordance with the traffic contract determined by the analysis module 42. Transmission module 52 is also responsible for interfacing with switched network 22 and establishing a connection between source location 10 and each destination location 14.

As further illustrated in FIG. 4, source location 10 also includes a network model 44 and a decoder buffer model 46. Network model 44 provides relevant network parameters and rate information to analysis module 42 in order to facilitate the operation of the analysis phase. Decoder buffer model 46 is a model of the decoder buffer provided at the source and provides relevant buffer information (such as buffer size and frame rate) to the analysis module 42 and transmission module 52. Network model 44 and decoder buffer model 46 preferably reside at the source location 10 and are implemented through any suitable combination of hardware and/or software. The various parameters that are provided to network model 44 and decoder buffer model 46 may be manually entered or provided by a user or automatically selected from a database (not shown) based on selected criteria or standards. In accordance with an aspect of the invention, analysis module 42, transmission module 52, network model 44 and decoder buffer model 46 are fully integrated and implemented as part of a video server that interfaces with video storage device 24 at the source location 10.

At each destination location 14, a video decoder 34 is provided for decoding video streams received over the switched network 22. Video decoder 34 preferably includes a buffer storage device 35 and a decoder device 37. During transmission of a video stream, buffer 35 receives and temporarily stores the transmitted video frames. The buffered video frames are then transferred to decoder 37 for subsequent decoding. Decoder 37 decodes the video frames in accordance with the standard or technique utilized at the source to encode the video. Preferably, decoder 37 is capable of decoding MPEG video streams. Decoder 37 may also be implemented to decode other types of encoded video, such as motion-JPEG video or any other variable bit rate coded video format.

As further shown in FIG. 4, each destination location 14 also includes a display device or unit 36. The video streams decoded by decoder 37 are further processed and displayed by display device 36 to permit a user or client to view the video in full motion or still-frame sequence. For this purpose, display device 36 may include a video display screen or other types of suitable display units.

Figure 5:
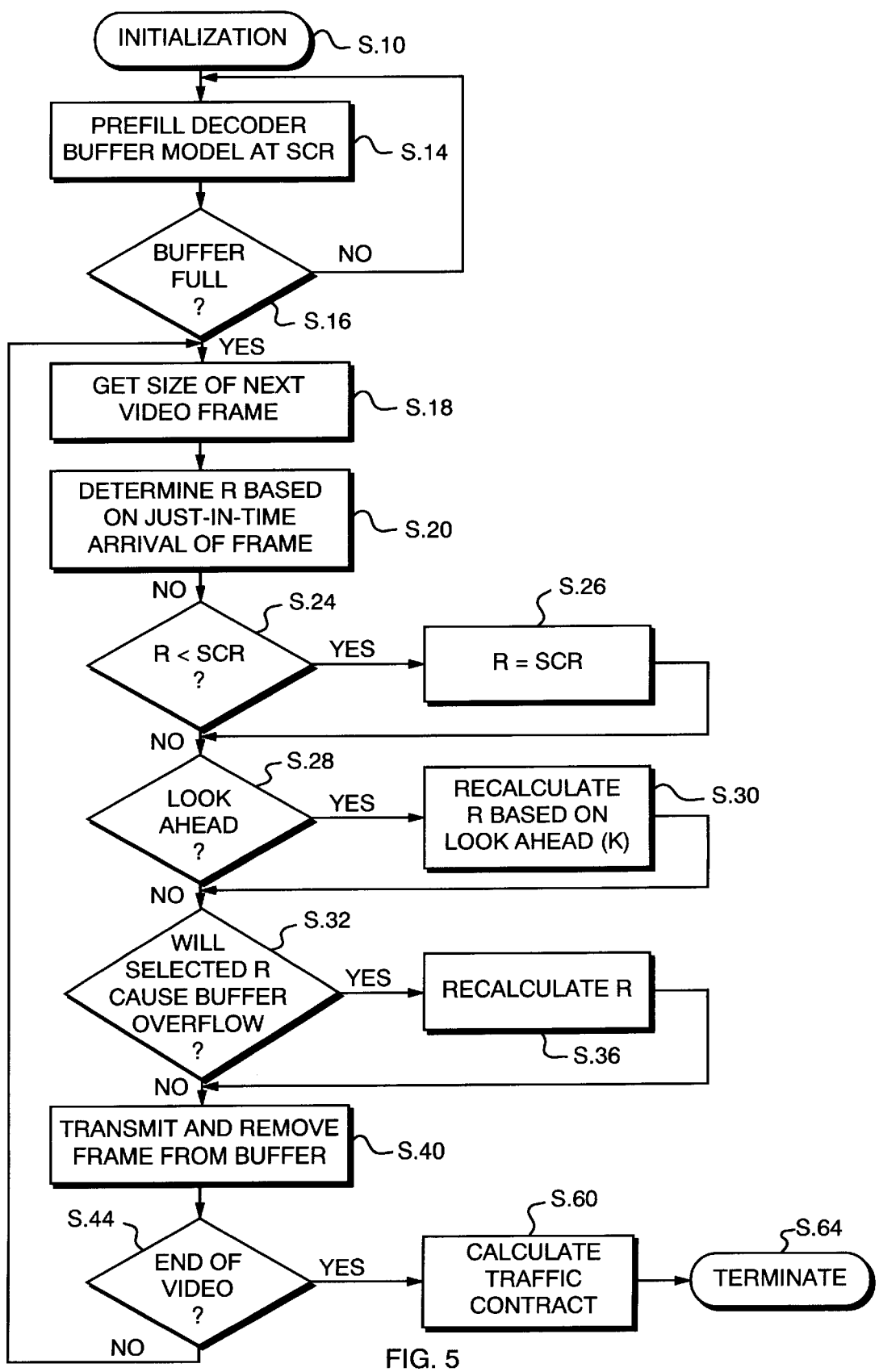
FIG. 5 is an exemplary flow chart of the various processes and operations that may be performed to analyze an encoded video stream and determine various traffic control parameters, consistent with the principles of the invention.

In the embodiment of FIG. 4, video decoder 34 also includes suitable hardware for interfacing with switched network 22 and receiving the video streams transmitted from source location 10. For user interactive applications or services, video decoder 34 may also include signaling technology for signaling and instructing source location 10 to retrieve and provide specific video clips stored in video storage device 24. Further, video decoder 34 may be implemented as a set-up box connected to switch network 22 and display 36, and/or may be implemented by use of any commercial available video decoder. Referring now to FIG. 5, a description of the various processes and operations that are performed during the analysis phase will be provided. The pre-transmission video analysis is performed to determine the best traffic contract for the encoded variable bit rate video stream. During the analysis phase, transmission of the frames of the video sequence is simulated while modeling the state and operation of the decoder buffer. A decoder buffer model is also used during the transmission phase, as further described below. The decoder buffer model may be implemented in various ways. For example, the MPEG standards define a Video Buffer Verifier (VBV) for encoding. The VBV is a decoder model that is conceptually connected to the output of an encoder. The VBV model may be used as the model decoder buffer for the analysis phase and transmission phase of the invention. However, the invention is not limited to a model that is based on the VBV. As will be apparent from the following description, other decoder buffer models may be provided so long as the parameters defining the model are used consistently in the analysis phase and transmission phase.

In the analysis phase, the fullness of the buffer model is used to determine the needed traffic control parameters for transmitting the stored video clip. The traffic contract is determined based on achieving the best utilization of bandwidth while guaranteeing the desired QoS requirements for the application. In the embodiment of FIG. 5, a shaping algorithm is utilized with the goal of minimizing network resources without overflowing or underflowing the decoder's buffer. As indicated above, a model of the decoder buffer is maintained at the source and is defined based on a specified buffer size and rate at which frames are removed from the buffer. The buffer size in the analysis phase may be measured in accordance with the maximum number of ATM cells or bits that can fit into the buffer model. The decoder buffer model must also specify when to start to remove frames from the buffer; that is, a fullness level or particular time at which to remove frames from the buffer. For example, in MPEG the VBV delay specifies how much time must elapse between when a frame is inserted and when it is removed or decoded from the buffer.

A just-in-time scheduling approach is used to analyze the entire video sequence prior to transmission. With just-in-time scheduling analysis, the system will operate at the selected sustained rate, unless buffer underflow or overflow conditions occur. In either case, the transmission rate is modified to prevent loss of data. For overflows, the rate is reduced so that the buffer never exceeds its capacity. In the case of underflows, the just-in-time scheduling determines the rate that is required to guarantee arrival of the data just-in-time for processing. For a given sustained cell rate, the just-in-time scheduling analysis simulation produces values for the Peak Cell Rate (PCR) and Sustainable Burst Size ($MBS_s$) needed to guarantee that no decoder buffer underflows or overflows will occur when the video clip being analyzed is transported.

In the analysis phase, the value for the Sustained Cell Rate (SCR) may be selected in accordance with the available network resources and the average and peak rate characteristics of the video sequence. The Sustainable Burst Size ($MBS_s$) can be related to the Maximum Burst Size (MBS) using the following formula:

$$MBS_S = \frac{(PCR - SCR) * MBS}{PCR}$$

For large video frames, the just-in-time scheduling method may require extremely high rates to guarantee the arrival of the frames in time for processing at the decoder. Long video frames are normally sent over many frame periods. For example, an I-picture frame after a scene change may be very large and may require five to ten times the number of bits of an average P-picture frame. To solve this problem, the present invention includes a look-ahead process that looks ahead a predetermined number of video frame periods to determine when these high rates will be required so that data can be sent early to reduce the overall rate without overflowing the decoder buffer. Using just-in-time scheduling simulation with look-ahead, a traffic contract for a video stream can be attained by maximizing the decoder buffer utilization and minimizing the required PCR without changing the value of the $MBS_s$. As a result, the buffer is used effectively since during easy video passages transmission at the sustained rate will tend to completely fill the buffer, whereas for difficult passages the rate will be selected so that the data arrives just-in-time, and the buffer is potentially as empty as possible without underflow.

The pre-transmission analysis phase, as described above, may be performed by an analysis module (such as analysis module 42 in FIG. 4) provided at the source of the transmission. The analysis phase performs an analysis of the entire video sequence by emulating the transmission of video frames and keeping a model of the decoder buffer.

As illustrated in FIG. 5, the analysis phase is initialized at step S.10. During this step, a model of the decoder buffer is created or instantiated based on one or more parameters that are representative of the decoder buffer provided at the client or destination location. These parameters include the buffer size of the decoder, the frame rate at which video frames are taken from or read out of the decoder buffer and when to start removing frames from the decoder buffer. As indicated above, the buffer size is preferably modeled in the analysis phase based on the maximum number of ATM cells or bits that can fit into the decoder buffer. The buffer size may be selected based on a standard associated with the encoded video or selected based on the specific abilities of the system or application. For example, MPEG-1 specifies a buffer size of 327,680 bits, while MPEG-2 at main level and main profile uses a buffer size of up to 1,835,008 bits. The frame rate may be set or selected based on the rate at which video frames are decoded by the decoder in accordance with a standard (e.g., one of the MPEG standards) or a rate that is applicable for the particular system or application. The model of the decoder buffer also includes a parameter that is representative of the present capacity or number of frames held in the buffer. When initialization of the analysis phase is performed at step S.10, the buffer may be assumed as being empty and the value of this parameter accordingly set to zero.

During the initialization at step S.10, a model of the network is also created or instantiated with one or more parameters that are representative of the network transmission characteristics. These parameters include the selected transmission rate which, in the embodiment of FIG. 5, corresponds to the sustained cell rate (SCR) at which the video is transmitted. Another network parameter which may be used to define the network model is network jitter. The network jitter parameter may be predefined or set in accordance with the tested or average network jitter value for the network or may be a standard or assumed jitter network value. For certain applications and network configurations, jitter may be ignored with a constant delay network assumed.

Following step S.10, the analysis phase continues at step S.14 where the decoder buffer model is pre-filled with video frames at the selected SCR. Based on the buffer size, the decoder buffer model is pre-filled at step S.14 up to maximum number (N) of video frames which will fit in the decoder buffer. Since each video frame may consist of several cells, and frames and cells are both measured in terms of bits, a simple conversion may be performed to determine and simulate the number of frames that would be transmitted at the SCR. At step S.16, it is determined whether the decoder buffer is full after each video frame is placed in the decoder buffer. In other words, a determination is made at step S.16 whether there is enough space in the buffer to store the next complete video frame in the buffer. If the decoder buffer is not full at step S.18, then another video frame is placed into the decoder buffer in accordance with the selected SCR at step S.14. If it is determined that the decoder buffer is full at step S.16, then logic proceeds to steps S.18 and S.20 so that the transmission rate R for the next frame to be transmitted is determined.

At step S.18 in FIG. 5, the size of the next video frame to be transmitted after the pre-fill of the decoder buffer is determined. Thereafter, at step S.20, the transmission rate R for the next frame of video is calculated. The transmission rate R is calculated at step S.20 based on the just-in-time arrival rate of the frame. For example, the rate R may be calculated in accordance with the following expression:

$$R = \frac{\text{frame\_size}(N+1)}{N * \text{frame\_period}}$$

where "N" is the maximum number of video frames that will fit in the decoder buffer, "frame_period" is equal to 1/frame-per-second, and "frame_size" is the frame size of the decoder buffer. The above-noted formula is only used to calculate the rate R for the first frame after the pre-fill of the buffer.

Following step S.20, two constraints or conditions are analyzed to determine whether it is necessary to reset or recalculate the transmission rate R. These conditions are the underflow of the buffer model (analyzed at step. S.24) and the overflow of the buffer model (analyzed at step S.32). In particular, at step S.24, it is determined whether the calculated transmission rate R is less than the SCR. This constraint is analyzed in order to maximize the potential fullness of the decoder buffer. If the transmission rate R is less than SCR at step S.24, then at step S.26 the transmission rate is set to the SCR for the next video frame. Thereafter, the logic flow proceeds to step S.28. If the transmission rate is not less than SCR at step S.24, then logic flow proceeds directly to step S.28 and, thereafter, to step S.32 in order to analyze the next constraint.

Before testing the overflow condition of the buffer at step S.32, the analysis module may perform a look ahead procedure to recalculate the rate R. That is, the just-in-time analysis may be implemented with a look ahead procedure that is performed on each video frame. As indicated above, look ahead analysis may be needed for video sequences that include large video frames. Since the look ahead analysis has little effect on small or normal size frames, the look ahead procedure may be included as part of the analysis phase for all video sequences. Alternatively, the look ahead procedure may be selectively used only in connection with video sequences that are determined to have large video frames or extremely high rates. In any event, if the look ahead analysis is determined as being included in the analysis phase for the video sequence at step S.28, then at step S.30 the transmission rate R is recalculated based on a predetermined look ahead period of k frames (e.g., five or ten frames). At step S.30, the rate R may be used as the rate for the frame period. In the look ahead procedure, the video analysis stops in time and looks k frame periods ahead to calculate the future rates of the k frame periods (such as from frame $R_1$ to frame $R_k$). Through this analysis, a determination is made as to whether more data can be sent to smooth the upcoming high rates, while not violating the decoder buffer or modifying the resultant traffic contract. This is performed by choosing the maximum rate ($R_{max}$) in accordance with the following equation:

$$R_{\max} = \max_{1 \le j \le k} \left[ \frac{1}{j} \sum_{i=1}^{j} R_i \right]$$

where "$R_{max}$" must be greater than or equal to R so that the value of the $MBS_s$ will not change or result in a different traffic contract. In order to assure that $R_{max}$ is greater than or equal to R, all average rates are calculated for the look ahead period and the maximum average is chosen and compared with R to choose the largest.

Figure 6:
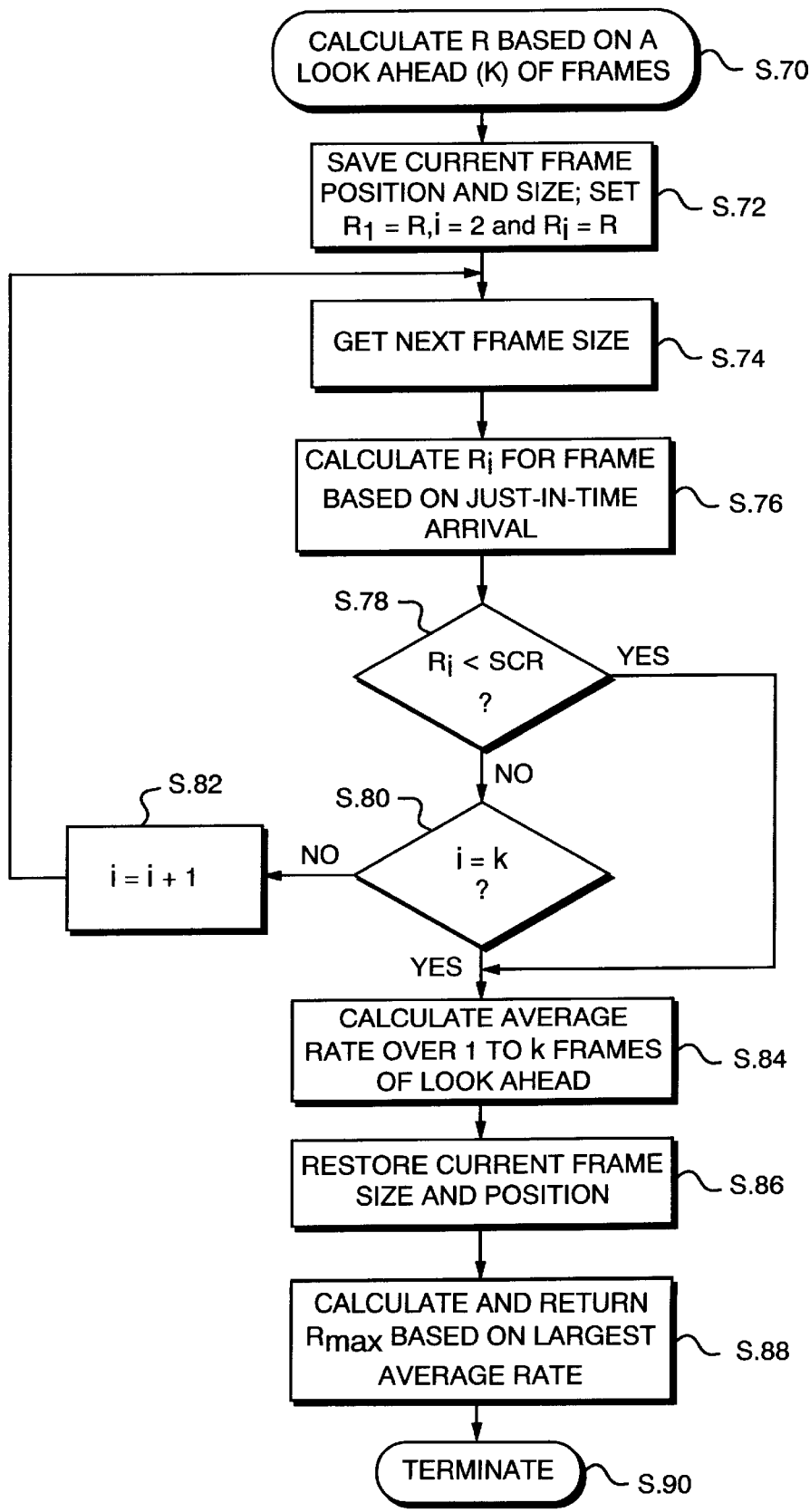
FIG. 6 is an exemplary flow chart of the various processes and operations that may be performed to recalculate the transmission rate for a video frame based on a look ahead procedure, consistent with the principles of the invention.

FIG. 6 illustrates an exemplary flowchart of the various operations and processes that may be performed at step S.30 in FIG. 5 to recalculate the rate R through a look ahead analysis and determination of the maximum average rate. The various processes and operations performed in the look ahead analysis of FIG. 6 may be programmed with software through a high level programming language, such as C or C++.

In order to recalculate the transmission rate R at step S.30 in FIG. 5, the look ahead analysis procedure of FIG. 6 may be entered at step S.70. As part of the initialization of the look ahead procedure, the frame position and size of the current video frame may be saved at step S.72. In the look ahead procedure, the current frame is the frame for which the transmission rate R is being recalculated. At step S.72, various variables are set or initialized, as shown in FIG. 6. For example, the value of $R_1$ is set to the current value of the transmission rate R. Further, the value of a frame count or pointer "i" is set to 2 and the rate $R_i$ is set to the current value of the transmission rate R. Following step S.72, the size of the next video frame is then determined at step S.74.

At step S.74 the size of the next video frame is obtained. After determining the next frame size at step S.74, logic flow proceeds to step S.76 where the rate $R_i$ for the next frame is calculated based on a just-in-time arrival analysis. At step S.76, the rate $R_i$ may be determined in accordance with the calculation at step S.20 in FIG. 5. After determining the rate $R_i$ for the next frame, a determination is made at step S.78 as to whether $R_i$ is less than the sustained cell rate (SCR). If $R_i$ is less than the SCR, then logic flow proceeds to step S.84. Otherwise, if $R_i$ is not less than the SCR, then at step S.80 a determination is made as to whether all of the frames have been analyzed. That is, at step S.80 a determination is made as to whether the value of i equals the number of look ahead frames k. If i equals k, then logic flow proceeds to step S.84. However, if i does not equal k at step S.80, then i is incremented by 1 at step S.82 and logic flow returns to step S.74 to analyze and determine the rate for the next frame in the look ahead frame period.

At step S.84, the average rate is calculated for each of the frames within the look ahead period. That is, the average rate over 1 to k frames of look ahead is calculated at step S.84. The average rates may be calculated at step S.84 in accordance with the following:

$$R_j^{average} = 1\left[\frac{1}{j}\sum_{i=1}^{j} R_i\right]$$
$$_{1 \le j \le k}$$

Following step S.84, the current frame size and position is restored at step S.86 and the rate for the current frame is calculated and returned at step S.88 based on the largest average rate. In particular, at step S.88, the largest average rate ($R_{max}$) is returned from the look ahead analysis as the rate for the current frame. The calculation at step S.88 may be determined in accordance with the following:

$$R_{max} = \max_{1 \le j \le k}(R_j^{average})$$

Referring again to FIG. 5, the rate $R_{max}$ may be used for the next frame period, unless the decoder buffer will be cause to overflow based on this rate. In such a case, the rate is recalculated with N replaced with the number of current frames in the decoder buffer. In particular, logic flow proceeds from step S.30 to step S.36 after determining that the rate will cause buffer overflow at step S.32. The transmission rate is recalculated at step S.36 in accordance with the following expression:

$$R = \frac{decoder\_buffer\_size - decoder\_buffer\_occupancy}{N * frame\_period}$$

where "decoder_buffer_size" is the size of the decoder buffer and "decoder_buffer_occupancy" is the number of frames occupying the decoder buffer. Following the recalculation of the transmission rate R at step S.36, logic flow proceeds to step S.40 in FIG. 5.

At step S.32 in FIG. 5, a determination is made as to whether the rate selected will cause buffer overflow. This condition may be tested in several ways. For example, if (R*frame_period) is greater than (decoder_buffer_size − decoder_buffer_occupancy) then overflow will occur. If it is determined at S.32 that the transmission rate R will cause buffer overflow, then the transmission rate R is recalculated at step S.36, as described above. If it is determined at step S.32 that the selected rate R will not cause buffer overflow, then logic flow proceeds directly to step S.40.

At step S.40, the next video frame is transmitted at the transmission rate R and a video frame is removed from the decoder buffer in accordance with the rate specified or associated with the decoder buffer model. Every time a frame is removed from the decoder buffer, a new transmission rate R for the next frame period determined in accordance with the constraints discussed above with reference to steps S.24–S.36, with N being replaced in the above-noted equations with the number of current frames in the decoder buffer. That is, if it is determined at step S.44 that the end of the video sequence has not been reached, then the size of the next video frame is determined at step S.18 and at step S.20 the transmission rate R for the next frame period is calculated in accordance with the following expression:

$$R = \frac{frame\_size(N + i) + delta}{current\_frames * frame\_period}$$

where "delta" is the untransmitted data portion from the previous frame period, "i" is the number value of the next frame period, and "N" is the number of current frames in the decoder buffer. Thereafter, the constraints at step S.24 and step S.32 are examined as described above, with N being updated with the number of current frames in the decoder buffer.

Figure 7:
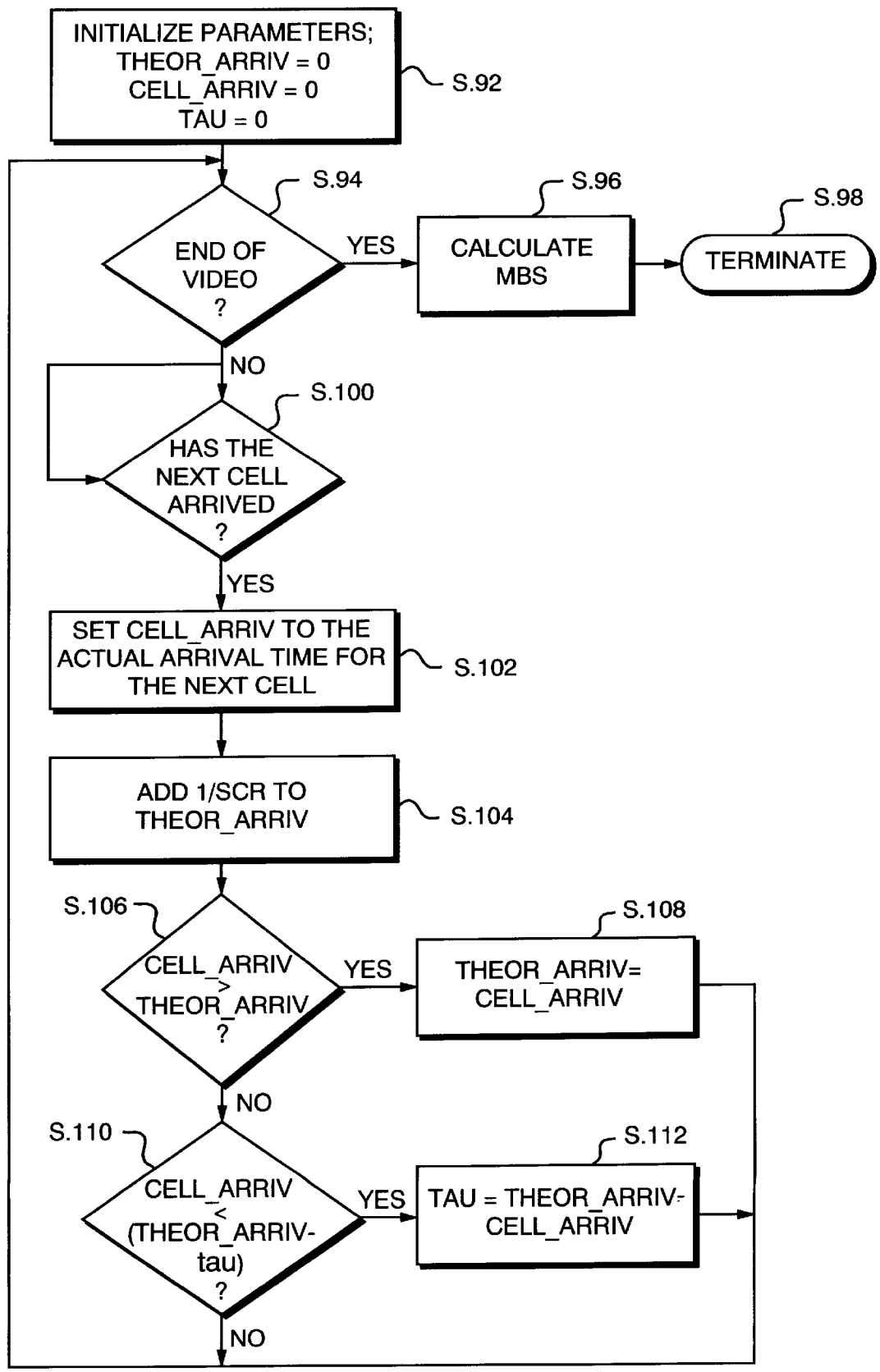
FIG. 7 is an exemplary flow chart of the various processes and operations that may be performed to calculate the maximum burst size, consistent with the principles of the invention.

If it is determined at step S.44 that the end of the video sequence has been reached, then pre-transmission analysis of the video sequence is completed by calculating the traffic contract parameters at step S.60. In this regard, the determined transmission rates R for each of the video frames is analyzed to determine the traffic contract parameters. In particular, the Peak Cell Rate (PCR) may be set to the largest peak rate for the video frame that was analyzed. Further, as discussed above, the Maximum Burst Size (MBS) may be calculated from analyzing the stream and spacing between cells and determining where the worst clumping of cells exists. FIG. 7, described further below, illustrates an exemplary flow chart of the various operations and processes that may be performed to calculate MBS. Finally, the sustainable burst size ($MBS_S$) may be derived from the selected SCR, the PCR and MBS in accordance with the following expression:

$$MBS_S = \frac{(PCR - SCR) * MBS}{PCR}$$

Following step S.60, the analysis phase terminates at step S.64, as illustrated in FIG. 5.

FIG. 7 illustrates a flowchart of the various processes and operations that may be performed in order to calculate the maximum burst size (MBS). The procedure of FIG. 7 may be performed by the analysis module when determining the traffic contract parameters for a particular video sequence. For example, this procedure may be performed by the analysis module as part of the pre-transmission video analysis described above with reference to FIG. 5. The various procedures and operations depicted in FIG. 7 may be implemented through software using a high level programming language, such as C or C++.

As illustrated in FIG. 7, the procedure for calculating the MBS starts off at step S.92, where various parameters or variables are initialized. In particular, "theor_arriv" and "cell_arriv" are set to 0 or the current time. The variables theor_arriv and cell_arriv represent the theoretical and actual cell arrival times, respectively, a sequence of cells. Another parameter or variable that is initialized step S.92 is "tau" which represents the maximum difference between the theoretical and actual cell arrival times. At step S.92, the value of tau may be set to 0.

Following step S.92, a determination is made at step S.94 whether the end of the video sequence has been reached. If the end of the video has been reached, then at step S.96 the value of MBS is calculated and the procedure terminates at step S.98. A more detailed description of the manner in which MBS is calculated at step S.96 is provided below. If it is determined that the end of the video sequence has not been reached, then logic flow proceeds to step S.100 where it is determined whether the next cell has arrived. By simulating the transmission of cells over the network, the analysis module can determine at step S.100 when cells arrive at the decoder buffer. If it is determined that a cell has not arrived, then logic flow loops back to again test whether a cell has arrived. When it is determined that the next cell has arrived, then at step S.102 the value of cell_arriv is set to the actual arrival time of the cell. Thereafter, at step S.104, the value of 1/SCR is added to the value of theor_arriv. Following step S.104, the actual arrival time for the cell is then compared to the theoretical arrival time at step S.106.

In particular, it is determined whether the value of cell_arriv is greater than the value of theor_arriv. That is, it is determined whether the cell arrived later than expected. If the actual arrival time for the cell is greater than the theoretical arrival time, then at step S.108 the value of theor_arriv is set to be equal to the value of cell_arriv. As a result, the theoretical cell arrival time is set to be equal to the actual cell arrival time. Following step S.108, logic flow returns to step S.94 so that additional cell arrival times may be analyzed.

If it is determined at step S.106 that the actual cell arrival time is not greater than the theoretical cell arrival time, then a determination is made at step S.100 as to whether the actual cell arrival time is less than the theoretical arrival time. That is, at step S.110, it is determined whether the value of cell_arriv is less than the value of (theor_arriv–tau). If the actual cell arrival time is less than the theoretical arrival time, then at step S.112 tau is set to be equal to the difference between the theoretical and actual cell arrival time (i.e., tau=theor_arriv–cell_arriv). Following step S.112, logic flow loops back to step S.94 so that additional cells may be analyzed.

When it is determined that the end of the video sequence is reached at step S.94, then logic flow proceeds to step S.96 to calculate the value of the MBS. As discussed above, the value of MBS may be calculated based on the spacing between cells and where the clumping of cells is the greatest. After analyzing the entire video sequence, the value of tau will represent the maximum difference between the theoretical arrival time and the actual cell arrival time. Using tau, the value of MBS is calculated in accordance with the following equation:

$$MBS = 1 + int\left[\frac{tau}{1/SCR - 1/PCR}\right]$$

The process terminates at step S.98 following the MBS calculation procedure.

The embodiment of FIG. 5 may be utilized without considering network jitter. That is, for purposes of simplicity, the pre-transmission analysis of the video may be performed assuming a constant delay network. However, the analysis process of FIG. 5 can also be adapted or extended to yield a traffic contract that incorporates any assumed or selected network jitter. As indicated above, the value of the network jitter may be used to define the network model used by the analysis module. To calculate a traffic contract that incorporates network jitter, the just-in-time scheduling analysis method requirements can be relaxed so that data will arrive early enough to compensate for network jitter. By relaxing the constraints and permitting a certain amount of tolerance based on network jitter, video data can be allowed to arrive early enough to compensate for network jitter and thus prevent the decoder buffer from underflow. Network jitter can also cause the decoder buffer to overflow. This can be prevented by reducing the buffer threshold so that a safety margin exists to absorb network jitter and prevent buffer overflow.

The description of the embodiment of FIG. 5 assumes that a single SCR is selected or specified for the purpose of determining the traffic contract parameters. In accordance with an another embodiment of the invention, it is possible to perform multiple iterations of the pre-transmission video analysis phase using different values for SCR, and then determining the best traffic contract by comparing or analyzing the various generated traffic contracts for the different values of SCR.

Figure 8:
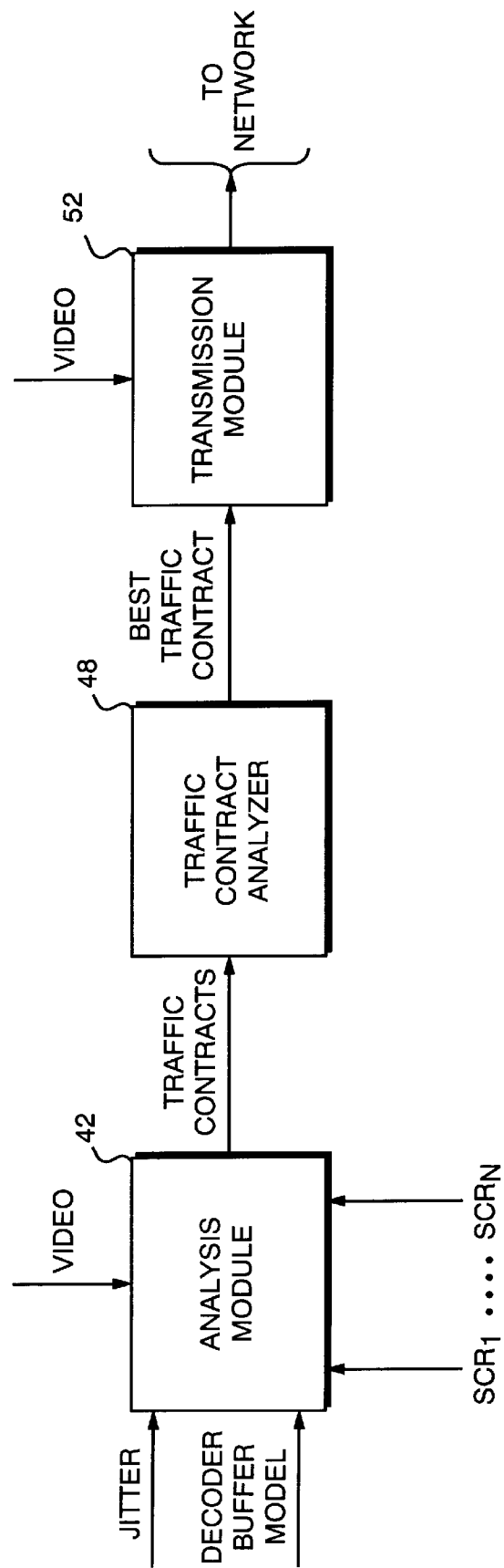
FIG. 8 illustrates an exemplary embodiment of a traffic contract analyzer for analyzing and determining the best traffic contract through an effective bandwidth metric, consistent with the principles of the invention.

FIG. 8 illustrates an exemplary embodiment of a traffic contract analyzer 48 for analyzing traffic contracts generated by, for example, the analysis module 42 based on an iterative analysis of a video stream with different SCR values. The embodiment of FIG. 8 may be useful for situations in which the network and/or decoder parameters change frequently, as more fully described below.

In the embodiment of FIG. 8, a traffic contract analyzer 48 is illustrated as being provided between analysis module 42 and transmission module 52. The illustration of FIG. 8 is a partial, modified view of the system environment of FIG. 4 and illustrates the location of the traffic contract analyzer 48 relative to the analysis module 42 and transmission module 52. During the analysis phase conducted by analysis module 42, the various network parameters (e.g., SCR, jitter) and decoder buffer model parameters (e.g., buffer size) to determine the traffic contract for the video stream. The pre-transmission analysis phase can be performed as an off-line operation with the results stored for later use by transmission module 52. However, if the network and/or decoder parameters change, the analysis process must be repeated based on the different parameters. In systems where the network and decoder parameters change frequently, either multiple traffic contracts must be pre-calculated or the analysis phase must be performed quickly by dedicated hardware at the source. Fast calculation of the traffic contract also allows many values of the SCR to be tested to determine which will require the minimum network resources (i.e., which has the smallest effective bandwidth).

Effective bandwidth is defined as the amount of link capacity or transmission bandwidth needed to serve a traffic source while satisfying a pre-specified cell loss probability and delay-variation criteria. The traffic contract analyzer 48 may use one or more effective bandwidth (EBW) metrics to select the SCR with the associated traffic contract that provides the smallest effective bandwidth. For this purpose, the various traffic contracts generated by analysis module 42, based on different SCR values and/or different network and decoder buffer parameters, are provided to traffic contract analyzer 48 where they are analyzed and compared in accordance with the effective bandwidth metric(s). Parameters such as the assumed traffic model, the ratio of peak-to-average rate, the maximum burst size, the cell loss ratio, the cell delay variation requirement and the multiplexer buffer size may be utilized to determine the EBW. The resultant or best traffic contract that requires minimum utilization of network resources is then provided by traffic contract analyzer 48 to transmission module 52 for the purpose of transmitting the video stream over the network.

As indicated above, the just-in-time scheduling simulation can look ahead a selectable number of frames and average high individual rates over a larger interval. From the definition of sustainable burst size, it is apparent that the value of $MBS_S$ exhibits little variation for different look-ahead periods, since its value greatly depends on the SCR and a lower PCR value will be offset by a larger MBS. The PCR of a specific video stream is reduced for larger look aheads. Longer look ahead periods imply a smoother transmission, which should require fewer network resources. However, as the look ahead period approaches one second of video, little variations are noticed in the traffic contract parameters. Therefore, the required network resources are about the same. As a result, for most applications the look ahead period may be limited to a video frame period or periods of approximately one second. The table below shows the effect on the ATM traffic contract parameters for an exemplary MPEG-2 Action Movie 2 clip when a different look ahead periods are used in the just-in-time scheduling analysis for a specific SCR.

TABLE 1

Effect of Look Ahead on Determining a Traffic Contract for an Exemplary MPEG Video Clip

| SCR (Mbps) | Look-ahead | PCR (Mbps) | MBS (cells) | $MBS_s$ (cells) |
|---|---|---|---|---|
| 4.85 | 1 | 11.1 | 22805 | 12840 |
| | 5 | 7.35 | 37776 | 12848 |
| | 10 | 6.56 | 49367 | 12868 |
| | 15 | 6.48 | 51136 | 12863 |
| | 30 | 6.1 | 62562 | 12820 |
| 5.3 | 1 | 7.97 | 2632 | 882 |
| | 5 | 6.32 | 5747 | 928 |
| | 10 | 6.04 | 7818 | 958 |
| | 15 | 5.99 | 8313 | 958 |
| | 30 | 5.85 | 10153 | 955 |

Figure 9:
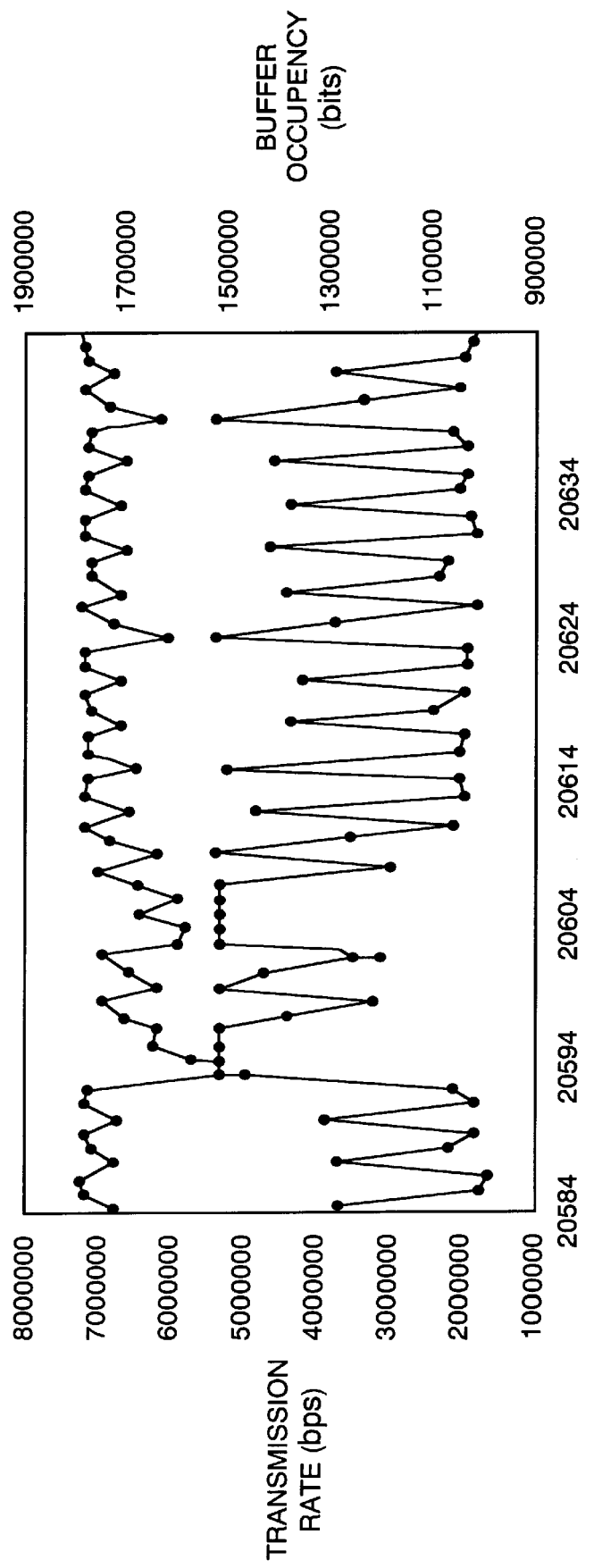
FIG. 9 illustrates the relationship between the decoder buffer occupancy and the transmission rate for an exemplary video stream.

To illustrate how the just-in-time scheduling analysis of the present invention adjusts the rate based on the decoding buffer occupancy to prevent overflows or underflows, an analysis of the relationship between the decoder buffer occupancy and the selected rates can be performed for a sample video sequence, such as a movie clip. By way of a non-limiting example, FIG. 9 is an illustration of a comparison of the decoder buffer occupancy versus the transmission rate during the analysis process. The analysis process reflected in FIG. 9 was performed for an exemplary MPEG-2 Action Movie 2 clip using a SCR of 5.3 Mbps and a look-ahead period of 30 frame periods.

From the point of view of an ATM traffic contract, transmitting at the sustained rate does not consume any tokens while transmitting above the sustained rate consumes tokens and transmitting below the sustained rate frees tokens. During the transmission process, the video stream may be transmitted in accordance with the determined traffic control parameters and based on the availability of tokens. As described above, the transmission phase also utilizes a model of the decoder buffer which is provided at the source for analysis during the transmission phase. The fullness of the decoder buffer is monitored during transmission to control the transmission rate and prevent overflow of the decoder buffer at the destination location.

Figure 10:
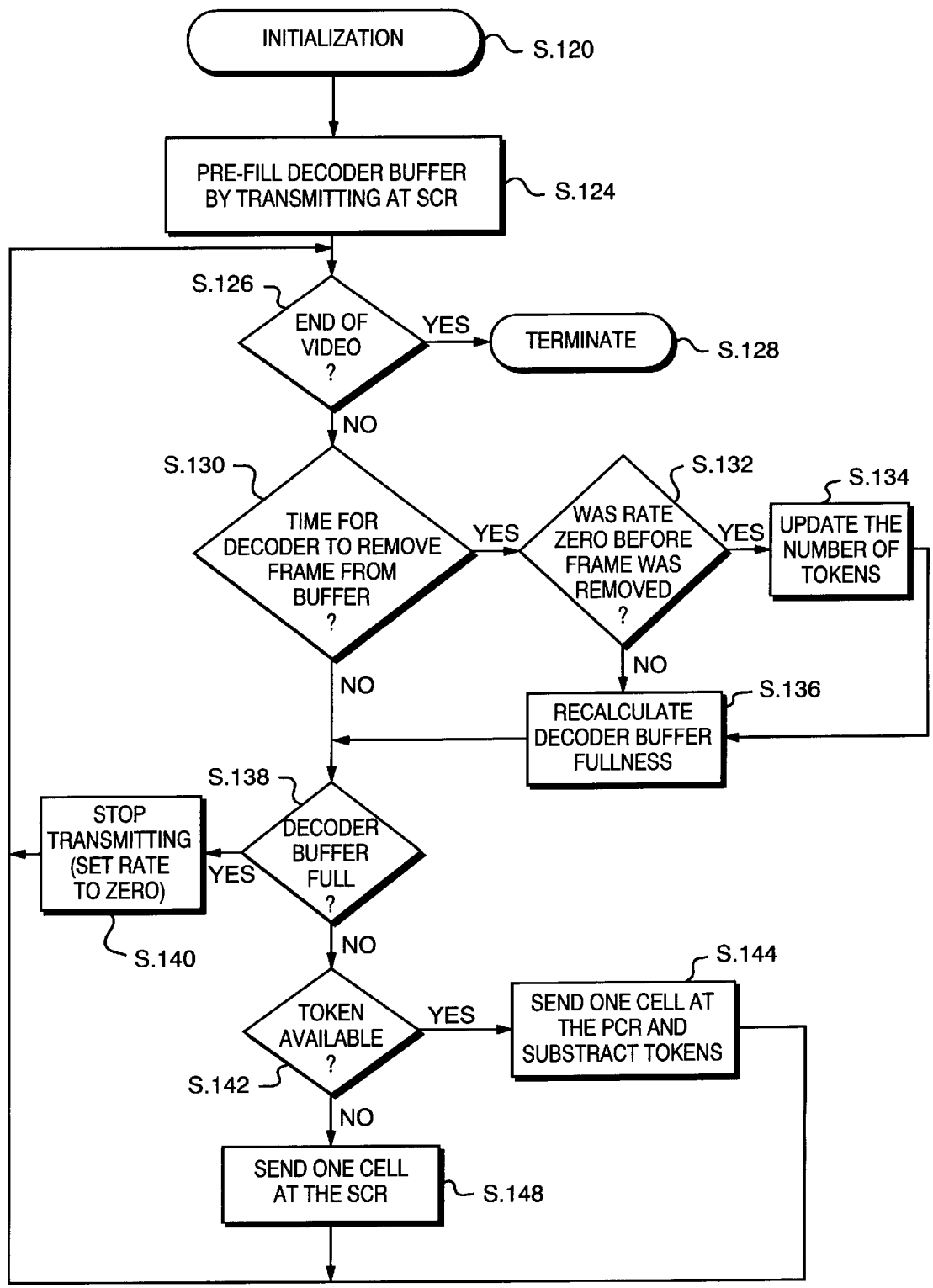
FIG. 10 is an exemplary flow chart of the various processes and operations that may be performed to transmit an encoded video stream over the network in accordance with the determined traffic control parameters.

FIG. 10 illustrates the various processes and operations that may be performed during the transmission phase. The transmission phase may be performed by, for example, transmission module 52 in the exemplary system environment of FIG. 4 after pre-transmission analysis of the video has been performed. In the embodiment of FIG. 10, the transmission state at any moment in time does not only depend on the pre-determined traffic contract, but also on the awareness of the fullness of the decoder buffer model assumed at the source.

As shown in FIG. 10, at step S.120 the transmission phase is initialized. During this initialization, the traffic contract parameters determined during the analysis phase are gathered and a model of the decoder buffer is created or instantiated. The traffic parameters received by the transmission module include the SCR, PCR, and $MBS_s$. The model of the decoder buffer is created or instantiated based on one or more parameters that are representative of the decoder buffer provided at the client or destination location. As described above, the decoder buffer parameters may include the buffer size, the frame rate at which video frames are removed from the decoder buffer and the time to start removing frames from the buffer. These parameters should be consistent with the parameters used to define the decoder buffer model in the analysis phase. In the transmission phase, the size of the buffer may be measured based on the maximum number of cells that can fit into the decoder buffer. During the transmission phase, the current capacity of the decoder buffer is monitored in order to detect underflow and overflow conditions. For this purpose, the decoder buffer model may also include a parameter representing the capacity of the buffer. At step S.120, the capacity parameter may be set to zero when the transmission phase is initialized. Also, at step S.120, the number of tokens is set to the value of $MBS_s$. During initialization, the transmission module may also establish a connection between the source and destination over the switched network. For an ATM network, the connection may be established based on the traffic contract determined during the analysis phase.

Following step S.120, the decoder buffer is pre-filled at step S.124 by transmitting video frames at the SCR. To prevent overflow of the decoder buffer, a periodic check of the state or capacity of the decoder buffer model is performed to determine when the decoder buffer is full. Thus, after transmitting each video cell or frame, a determination may be made at step S.124 to determine if the decoder buffer is full. This determination is performed based on the parameters defining the decoder buffer model at the source. For example, by comparing the number of transmitted cells to the buffer size or capacity, it is possible to determine when the decoder buffer is full. If the decoder buffer is not full, then pre-filling of the decoder buffer may continue. After pre-filling the decoder buffer, logic flow proceeds to step S.126 where it is determined if additional frames are to be transmitted or if the end of the video sequence has been reached. If it is determined that the end of the video sequence is reached, then at step S.128 the transmission phase will terminate. Otherwise, the transmission module will stop transmitting and wait until a frame is removed from the decoder buffer before transmitting the next video frame.

In particular, if it is determined that the end of the video sequence has not been reached, then an analysis is made at step S.130 to determine whether it is time for the decoder to remove a frame from the decoder buffer. This determination may be made by the transmission module based on the model of the decoder buffer and the specified rate at which frames are removed from the buffer and processed by the decoder. If it is determined that a video frame has been removed from the decoder buffer, then logic flow proceeds to step S.132. However, if it is determined that the time to remove a video frame from the decoder buffer has not been reached, then logic flow proceeds directly to step S.138, as shown in FIG. 10.

At step S.132, a determination is made whether the transmission rate was zero (i.e., whether transmission had stopped) before the time to remove a frame from the buffer was reached. If there was a zero transmission period ($T_{zero}$), then at step S.134 the number of available tokens in the sustained token bucket is incremented. In particular, the number of available tokens is incremented by a value equal to (SCR*$T_{zero}$). Following step S.134, logic flow proceeds to step S.136 so that the fullness of the decoder buffer may be analyzed and recalculated. After determining the fullness or capacity of the decoder buffer at step S.136, logic flow proceeds to step S.138 during which it is determined whether the decoder buffer is full. If the decoder buffer is full, then transmission is stopped at step S.140 and the transmission module waits until a frame has been removed from the decoder buffer before retransmitting video data. Thus, logic flow loops back to steps S.126 and S.130. If it is determined that the decoder buffer is not full, then at step S.142 a determination is made as to whether the sustained token bucket is empty. This determination in effect requires that enough tokens exist to send a cell at the PCR. If not enough tokens exist in the sustained token bucket and the decoder buffer is not full, then logic proceeds to step S.148 where one cell of video data is transmitted at the SCR. Otherwise, logic flow proceeds to step S.144.

At step S.144, one cell of video data is transmitted at the PCR. For each cell transported at the PCR, the number of available tokens in the sustained token bucket is decreased at step S.144 by a value equal to (PCR−SCR)/PCR. Logic flow then proceeds to step S.126 where a check is performed to determine if the end of the video has been reached.

If the sustained token bucket is empty at step S.142, then logic flow proceeds to step S.148 where one cell of video data is transmitted at the SCR. Following step S.148, the determination is again made at step S.126 as to whether the end of the video sequence is reached. As shown in FIG. 10, if there are no more video frames to transmit and the end of the video clip has been reached, then the transmission phase will terminate at step S.128. Otherwise, logic flow will proceed from step S.126 to step S.130 and, thereafter, logic flow continues through the above-mentioned steps to determine whether further video cells can be transmitted at the PCR or the SCR.

It will be apparent to those skilled in the art that various modifications and variations can be made to the invention without departing from the scope or spirit of the invention. For example, while the invention has been described with reference to variable bit rate encoded MPEG video, the invention may be applied to any variable bit rate encoded video. In addition, the invention may implemented in a wide array of network environments, and is not limited to ATM network systems. The invention can be used with any network environment that is capable of accepting a traffic contract or descriptor and providing some level of quality of service for a connection. This includes networks that send data over different routes (such as TCP/IP), so long as quality of service for a connection can be provided. The principles of the invention may also be applied to network environments in which data is sent over the network in packets or other types of cells to facilitate the transport of data.

Other modifications can be made to the disclosed embodiments of the invention. For example, while the present invention has been disclosed with reference to stored video sequences or clips at the source, the invention can be adapted to provide the analysis and transmission of video sequences for real-time applications. That is, the invention can be implemented in environments in which real-time encoding of the video is provided at the source. In such an arrangement, during the real-time encoding process by an encoder, the video is characterized to determine its complexity, and frame size targets are assigned. The real-time encoder can scan up to several seconds ahead to profile the video sequence. Such a process is generally referred to as rate control and can be used to produce either constant or variable rate video. The target frame sizes are normally constrained by the available buffer in the decoder and the desired video stream rate. These target frame sizes are used to set the quantization scale during the actual encoding of the video. The disclosed analysis phase of the present invention could be used to scan the targets frame sizes generated by the rate control algorithm and determine the traffic contract. If the sizes which the rate control algorithm selected do not meet the desired traffic contract, the targets frame sizes can be modified before the actual encoding of the video. This would allow the encoding process to generate a stream that meets a pre-specified traffic contract. A single traffic contract could be used for a video session, or the contract could be renegotiated as the video characteristics change.

By way of further example, interactive VCR-like controls can be supported by the invention during the transmission of variable rate MPEG streams, even though latency will be incurred when the current playback position is changed. In such a case, the decoder buffer must be flushed and refilled before decoding can be restarted. This may cause a delay that is dependent on the size of the decoder buffer used. Repositioning the playback point will not change the traffic contract determined in the analysis phase, since the analysis determines the worst case traffic contract over the entire video stream. High-speed playback can be supported through the features of the invention by dropping P-picture frames and sending only I-picture frames. However, such a modification changes the traffic contract and can significantly increase transmission requirements.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for analyzing and transmitting an encoded video sequence over a switched network, said system comprising:
    an analysis module that analyzes said video sequence to determine a set of traffic control parameters for transmitting said video sequence over the switched network with minimum use of network resources; and
    a transmission module that receives the set of traffic control parameters from said analysis module and transmits said video sequence over the network in accordance with the traffic control parameters.

2. A system according to claim 1, wherein said video sequence is transmitted in cells over the network from a source to a destination, and said analysis module includes a model of a decoder buffer and determines the set of traffic control parameters by calculating a transmission rate for each video frame of said video sequence based on a just-in-time scheduling analysis.

3. A system according to claim 2, wherein said analysis module sets the transmission rate for each video frame to a predetermined sustained cell rate provided no underflow or overflow condition of the model decoder buffer is detected.

4. A system according to claim 3, wherein said analysis module calculates in the case of an underflow condition of the model decoder buffer a transmission rate for a video frame that guarantees arrival of the video frame just-in-time for processing.

5. A system according to claim 3, wherein said analysis modules calculates in the case of an overflow condition of the model decoder buffer an adjusted transmission rate to prevent an overflow of the model decoder buffer.

6. A system according to claim 2, wherein said just-in-time scheduling analysis performed by said analysis module includes a look ahead process in which said analysis module calculates a transmission rate for a video frame by looking ahead a predetermined number of video frames and determining a maximum average transmission rate over the predetermined number of video frames.

7. A system according to claim 2, wherein the set of traffic control parameters determined by said analysis module includes a peak cell rate and a maximum burst size.

8. A system according to claim 7, wherein said analysis module sets the peak cell rate to the largest transmission rate calculated for the video frames of said video sequence.

9. A system according to claim 7, wherein said analysis module determines the maximum burst size by analyzing said video sequence and spacing in time between transmitted cells.

10. A system according to claim 7, wherein said transmission module includes a model of a decoder buffer and transmits said video sequence over the network at a sustained cell rate or the peak cell rate depending on the fullness of the decoder buffer model.

11. A system according to claim 10, wherein said transmission module stops transmitting cells if the decoder buffer model is full.

12. A system according to claim 1, wherein said analysis module and said transmission module are provided at the source of the transmission, and the encoded video sequence is a variable bit rate encoded video sequence.

13. A system according to claim 1, wherein said switched network comprises an Asynchronous Transfer Mode (ATM) network.

14. A system according to claim 1, further comprising a traffic contract analyzer that determines an optimum traffic contract from a plurality of traffic contracts provided as output to said traffic contract analyzer from said analysis module, said traffic contract analyzer including an effective bandwidth metric for determining the optimum traffic contract that will require minimum use of network resources.

15. A method for transporting a variable bit rate encoded video sequence over a switched network, said video sequence being transported in cells over the network from a source to a destination, said method comprising:

analyzing said video sequence, prior to transmission over the network, to determine a set of traffic control parameters that will minimize the network resources that are required for transmitting said video sequence; and transmitting said video sequence in cells over the network based on the determined set of traffic control parameters.

16. A method according to claim 15, wherein said method further comprises providing a model of a decoder buffer and determining the set of traffic control parameters by calculating a transmission rate for each video frame of said video sequence based on a just-in-time scheduling analysis.

17. A method according to claim 16, wherein said method further comprises setting the transmission rate for each video frame to a predetermined sustained cell rate unless underflow or overflow of the model decoder buffer will occur.

18. A method according to claim 17, wherein said method further comprises calculating, in the case of an underflow condition of the model decoder buffer, a transmission rate for a video frame that will guarantee arrival of the video frame just-in-time for processing.

19. A method according to claim 17, wherein said method further comprises calculating, in the case of an overflow condition of the model decoder buffer, an adjusted transmission rate to prevent an overflow of the model decoder buffer.

20. A method according to claim 16, wherein said analyzing comprises calculating a peak cell rate by setting the peak cell rate to the largest transmission rate calculated for the video frames of said video sequence.

21. A method according to claim 20, wherein said transmitting step includes monitoring the fullness of the decoder buffer model and transmitting said video sequence over the network at a predetermined sustained cell rate or the peak cell rate depending on the fullness of the decoder buffer model.

22. A method according to claim 15, wherein said analyzing comprises calculating a maximum burst size by analyzing said video sequence and spacing between transmission cells.

23. A method according to claim 15, wherein said method further comprises calculating a transmission rate for a video frame by looking ahead a predetermined number of video frames and determining a maximum average transmission rate over the predetermined number of video frames.

24. A method according to claim 15, wherein said method further comprises establishing a connection over the network in accordance with the determined set of traffic control parameters, said network comprising an Asynchronous Transfer Mode (ATM) network.

25. A method according to claim 15, wherein said method further comprises providing a model of a decoder buffer and compensating for network jitter to prevent an underflow or overflow condition from occurring in the model decoder buffer.

26. A video distribution system for distributing an encoded video sequence over a switched network, said system comprising:

means for analyzing said video sequence to determine a set of traffic control parameters based on a predetermined sustained cell rate and a just-in-time scheduling analysis of a transmission rate of each frame of said video sequence; and means for transmitting said video sequence over the network in accordance with the traffic control parameters determined by said analyzing means.

27. A system according to claim 26, said system further comprising means for providing a model of a decoder buffer and monitoring the fullness of the model decoder buffer based on the transmission rate of the each frame, wherein said analyzing means sets the transmission rate for each video frame to the predetermined sustained cell rate unless underflow or overflow of the model decoder buffer will occur.

28. A system according to claim 27, wherein said analyzing means includes means for calculating, in the case of an underflow condition of the model decoder buffer, a transmission rate for a video frame that will guarantee arrival of the video frame just-in-time for processing.

29. A system according to claim 27, wherein said analyzing means includes means for calculating, in the case of an overflow condition of the model decoder buffer, an adjusted transmission rate to prevent an overflow of the model decoder buffer.

30. A system according to claim 26, wherein said analyzing means further comprises means for calculating a transmission rate for a video frame by looking ahead a predetermined number of video frames and determining a maximum average transmission rate over the predetermined number of video frames.

31. A system according to claim 26, wherein the set of traffic control parameters determined by said analyzing means includes a peak cell rate, a maximum burst size and a sustainable burst size.

32. A system according to claim 26, further comprising a traffic contract analyzer that determines an optimum traffic contract from a plurality of traffic contracts provided as output to said traffic contract analyzer from said analyzing means, said traffic contract analyzer including an effective bandwidth metric for determining the optimum traffic contract that will minimize use of network resources.

33. A system according to claim 26, further comprising means for providing a model of a decoder buffer and means for compensating for network jitter to prevent an underflow or overflow condition from occurring in the model decoder buffer.

34. A method for analyzing an encoded video sequence to be transmitted over a network from a source location to a destination location, said method comprising:

providing a model of a decoder buffer, said decoder buffer model including parameters indicating the size of a decoder buffer provided at the destination location and a rate at which video frames are removed from the decoder buffer;

pre-filling said decoder buffer model at a predetermined sustained cell rate SCR, said decoder buffer model being pre-filled with a maximum number N of video frames of said video sequence that will fit in the decoder buffer model;

calculating a transmission rate R for the next video frame to be transmitted after the pre-filling of said decoder buffer model, said transmission rate R being calculated based on the size of the next video frame and the maximum number N of video frames that can be pre-filled into said decoder buffer model;

determining if said calculated transmission rate R is less than the sustained cell rate SCR;

setting said transmission rate R to be equal to the sustained cell rate SCR if it is determined that the rate R is less than the sustained cell rate SCR;

determining if the transmission R will cause an overflow of said decoder buffer model;

recalculating the transmission rate R if it is determined that overflow of said decoder buffer model will occur, said transmission rate R being recalculated based on the maximum number N of video frames that can be pre-filled into said decoder buffer model and the difference between the size of the decoder buffer model and the current occupancy of the decoder buffer model; and determining a new transmission rate for the next frame period after each video frame is removed from said decoder buffer model, said new transmission rate being calculated in accordance with the foregoing steps for calculating the transmission rate R and with the maximum number N being replaced with the number of current frames in the decoder buffer model.

35. A method according to claim 34, wherein said method further comprises determining a set of traffic control parameters based on the transmission rates calculated for each of the video frames of said video sequence, said set of traffic control parameters including a peak cell rate and a maximum burst size.

36. A method according to claim 35, wherein said method further comprises determining the peak rate by setting the peak cell rate to the largest transmission rate calculated for the video frames of said video sequence.

37. A method according to claim 35, wherein said method further comprises determining the maximum burst size by analyzing said video sequence and spacing between transmission cells.

38. A method according to claim 34, wherein said method further comprises calculating a transmission rate for a video frame by looking ahead a predetermined number of video frames and determining a maximum average transmission rate over the predetermined number of video frames.

39. A method according to claim 34, wherein said method further comprises compensating for network jitter to prevent an underflow or overflow condition from occurring in the decoder buffer model.

40. A method for transmitting an encoded video sequence over a switched network from a source location to a destination location, said method comprising:

providing a model of a decoder buffer, said decoder buffer model including parameters indicating the size of a decoder buffer provided at the destination location and a rate at which video frames are removed from the decoder buffer;

establishing a connection over the network in accordance with a predetermined set of traffic control parameters, said predetermined set of traffic control parameters including a sustained cell rate SCR and a peak cell rate PCR;

pre-filling the decoder buffer at the destination location by transmitting video frames of said video sequence over the network in transmission cells at the sustained cell rate SCR;

determining when said decoder buffer is pre-filled with a maximum number N of video frames that will fit in the decoder buffer based on the parameters of the decoder buffer model;

transmitting, after pre-filling the decoder buffer, the next transmission cell at the peak cell rate PCR if a token is available and the decoder buffer is not full; and transmitting, after pre-filling the decoder buffer, the next transmission cell at the sustained cell rate SCR if no tokens are available and the decoder buffer is not full.

41. A method according to claim 40, wherein said method further comprises decreasing the number of available tokens for every transmission cell transmitted at the peak cell rate PCR.

42. A method according to claim 40, wherein said method further comprises increasing the number of available tokens for each zero transmission period during which no cells were transmitted over the network.

* * * * *